(12) United States Patent
Cappellini et al.

(10) Patent No.: US 11,952,082 B2
(45) Date of Patent: Apr. 9, 2024

(54) COVERT DATA DELIVERY SYSTEM FOR SUB-SURFACE OCEANOGRAPHIC MOORINGS

(71) Applicant: Mooring Systems, Incorporated, Cataumet, MA (US)

(72) Inventors: James A. Cappellini, Falmouth, MA (US); William D. Watling, Rochester, MA (US); Jeffrey A. Kinder, Venice, FL (US)

(73) Assignee: Mooring Systems, Incorporated, Cataumet, MA (US)

( * ) Notice: Subject to any disclaimer, the term of this patent is extended or adjusted under 35 U.S.C. 154(b) by 384 days.

(21) Appl. No.: 17/500,144

(22) Filed: Oct. 13, 2021

(65) Prior Publication Data
US 2022/0111943 A1 Apr. 14, 2022

Related U.S. Application Data

(60) Provisional application No. 63/204,565, filed on Oct. 13, 2020.

(51) Int. Cl.
*B63B 22/28* (2006.01)
*B63B 21/50* (2006.01)
(Continued)

(52) U.S. Cl.
CPC .............. *B63B 22/28* (2013.01); *B63B 21/50* (2013.01); *B63B 22/04* (2013.01); *B63B 22/06* (2013.01);
(Continued)

(58) Field of Classification Search
CPC ....... B63B 22/00; B63B 22/023; B63B 22/04; B63B 22/06; B63B 22/08; B63B 22/12;
(Continued)

(56) References Cited

U.S. PATENT DOCUMENTS 2,422,337 A * 6/1947 Chilowsky ............... G01V 1/38
367/4
3,455,114 A * 7/1969 Burrus ................ E21B 33/0355
405/196
(Continued)

OTHER PUBLICATIONS

Doug Wilson, Doug Bennett, Inductive Telementary and Innovative Mooring Design Enables Cost-Effective Coral Reef Monitoring System, Ocean Science and Technology, Oct. 2019, 2 pages.

*Primary Examiner* — Ajay Vasudeva
(74) *Attorney, Agent, or Firm* — DALY, CROWLEY, MOFFORD & DURKEE, LLP

(57) ABSTRACT

A system and method for sending instrument data from a sub-surface activity, such as data collection by one or more sensors, to another location, e.g., a satellite, a ground-based location, a vessel, etc., with minimal time exposure and minimal visibility of any system components at the water surface. Exemplary embodiments include a motorized pay-out-and-retrieval system or device, an air injection device, and a water-level sensor with automation control that together can be used to move a vessel, connected to an antenna, from a position in the water column in which the antenna is below the surface to a higher position in which the antenna is at or above the surface for data transmission.

20 Claims, 21 Drawing Sheets

(51) Int. Cl.
*B63B 22/04* (2006.01)
*B63B 22/06* (2006.01)
*B63B 22/08* (2006.01)
*B63B 22/12* (2006.01)
*B63B 22/24* (2006.01)
*B63G 8/00* (2006.01)
*B63G 8/24* (2006.01)
*H04B 1/40* (2015.01)

(52) U.S. Cl.
CPC .............. *B63B 22/08* (2013.01); *B63B 22/12* (2013.01); *B63B 22/24* (2013.01); *B63G 8/001* (2013.01); *B63G 8/24* (2013.01); *H04B 1/40* (2013.01)

(58) Field of Classification Search
CPC ......... B63B 22/18; B63B 22/20; B63B 22/24; B63B 22/28; B63B 21/50; B63B 79/40; B63G 8/001; B63G 8/24; G01N 33/1886; H04B 1/40

USPC ............................ 441/2, 23–26, 33; 367/3–6
See application file for complete search history.

(56) References Cited

U.S. PATENT DOCUMENTS

| | | | | |
|---|---|---|---|---|
| 5,003,514 A | * | 3/1991 | Cotilla | G01S 3/801 367/4 |
| 5,129,848 A | * | 7/1992 | Etheridge | B63B 22/06 441/2 |
| 6,463,800 B2 | * | 10/2002 | Fowler | B63B 22/24 441/27 |
| 7,874,886 B2 | * | 1/2011 | Fowler | B63B 22/04 367/4 |
| 9,563,203 B2 | * | 2/2017 | Davoodi | B63G 8/001 |
| 2010/0197181 A1 | * | 8/2010 | Wainman | B63B 22/18 441/24 |

* cited by examiner

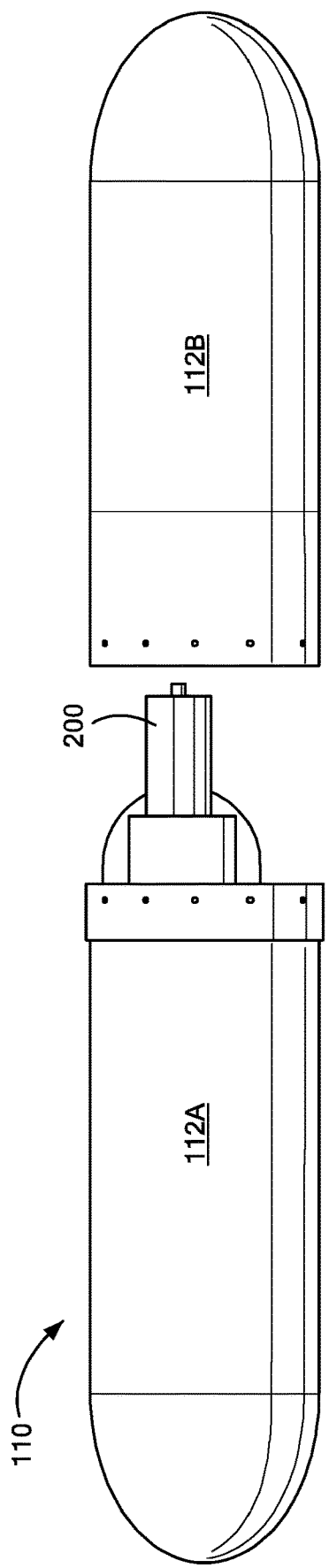
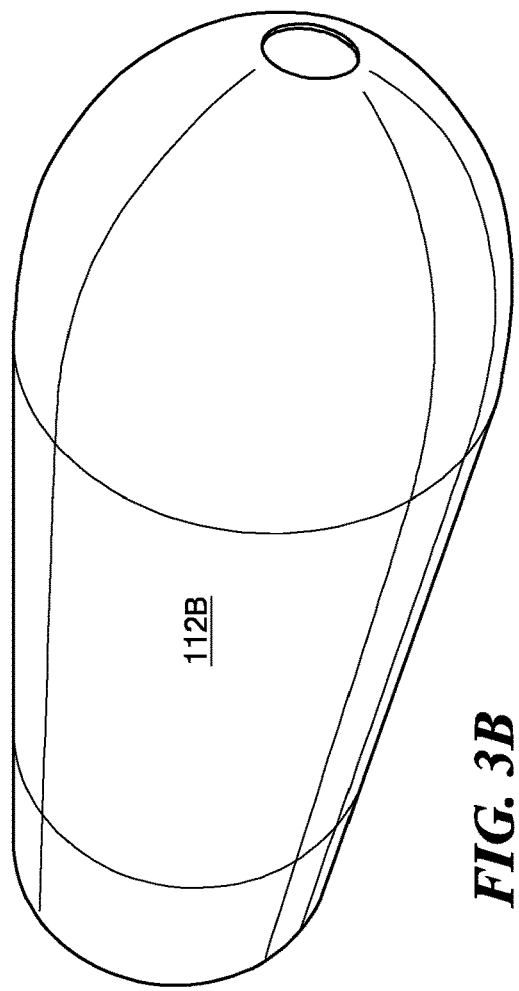
*FIG. 3A*
*FIG. 3B*

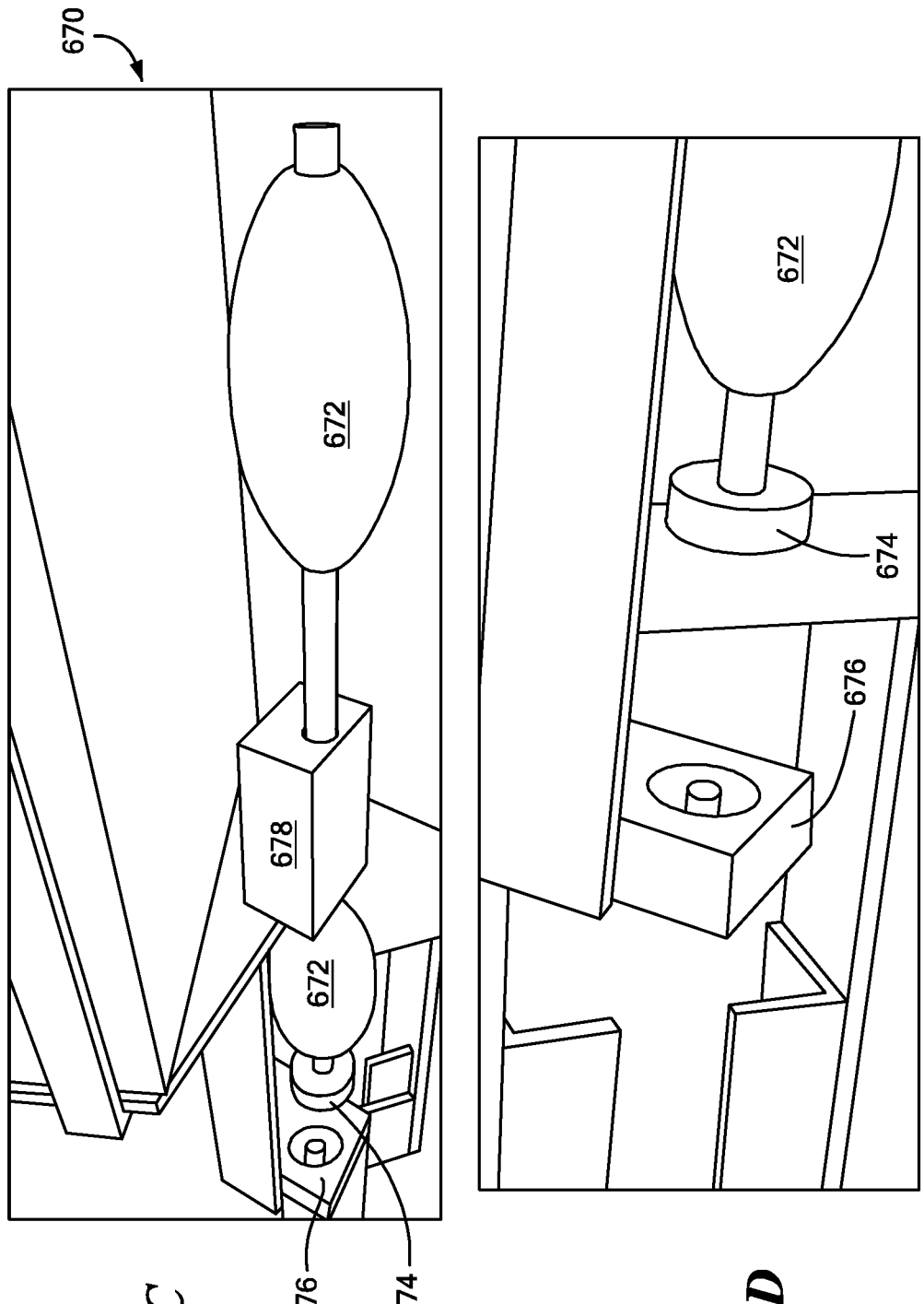

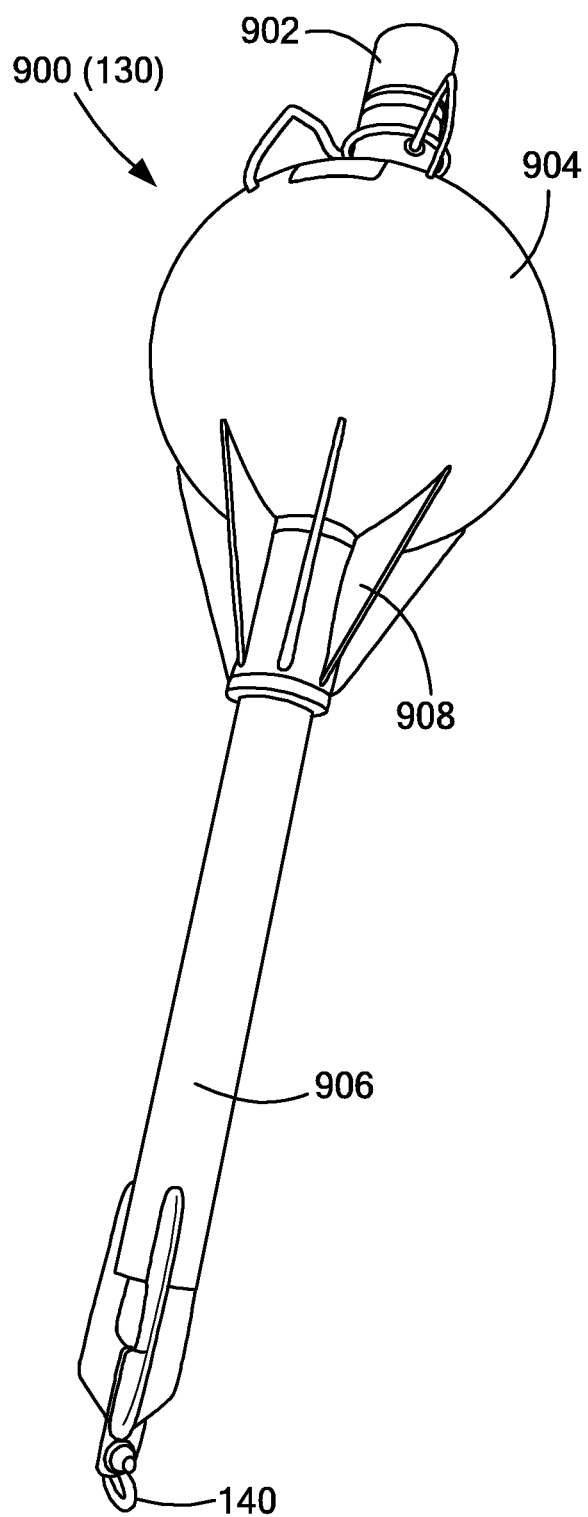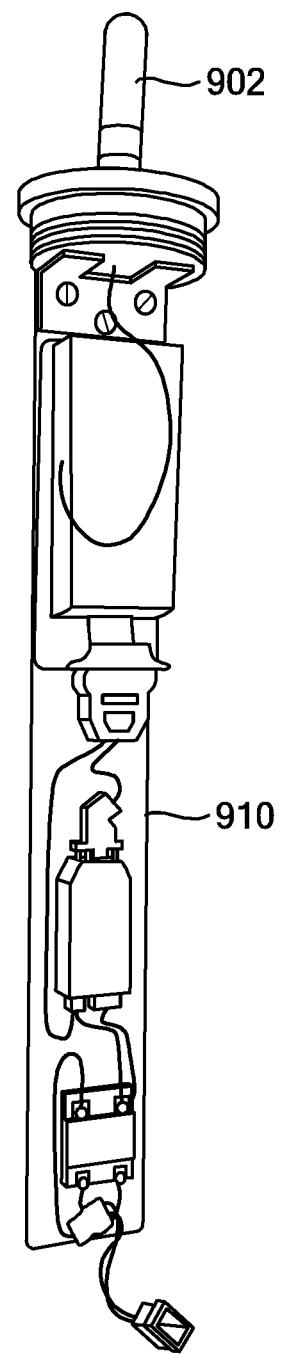
*FIG. 9A*  *FIG. 9B*

Water Level and Air Valve Control Circuitry

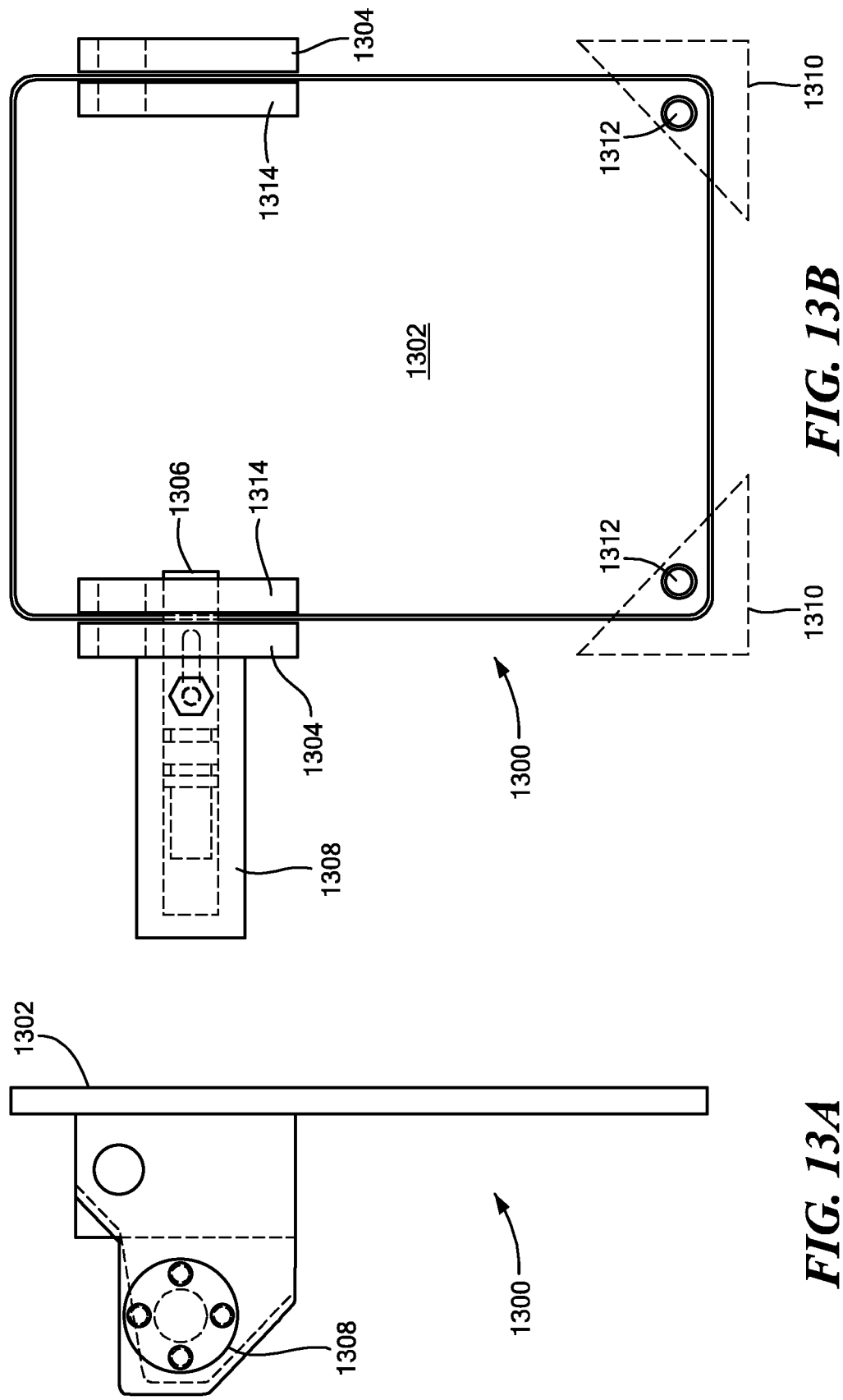

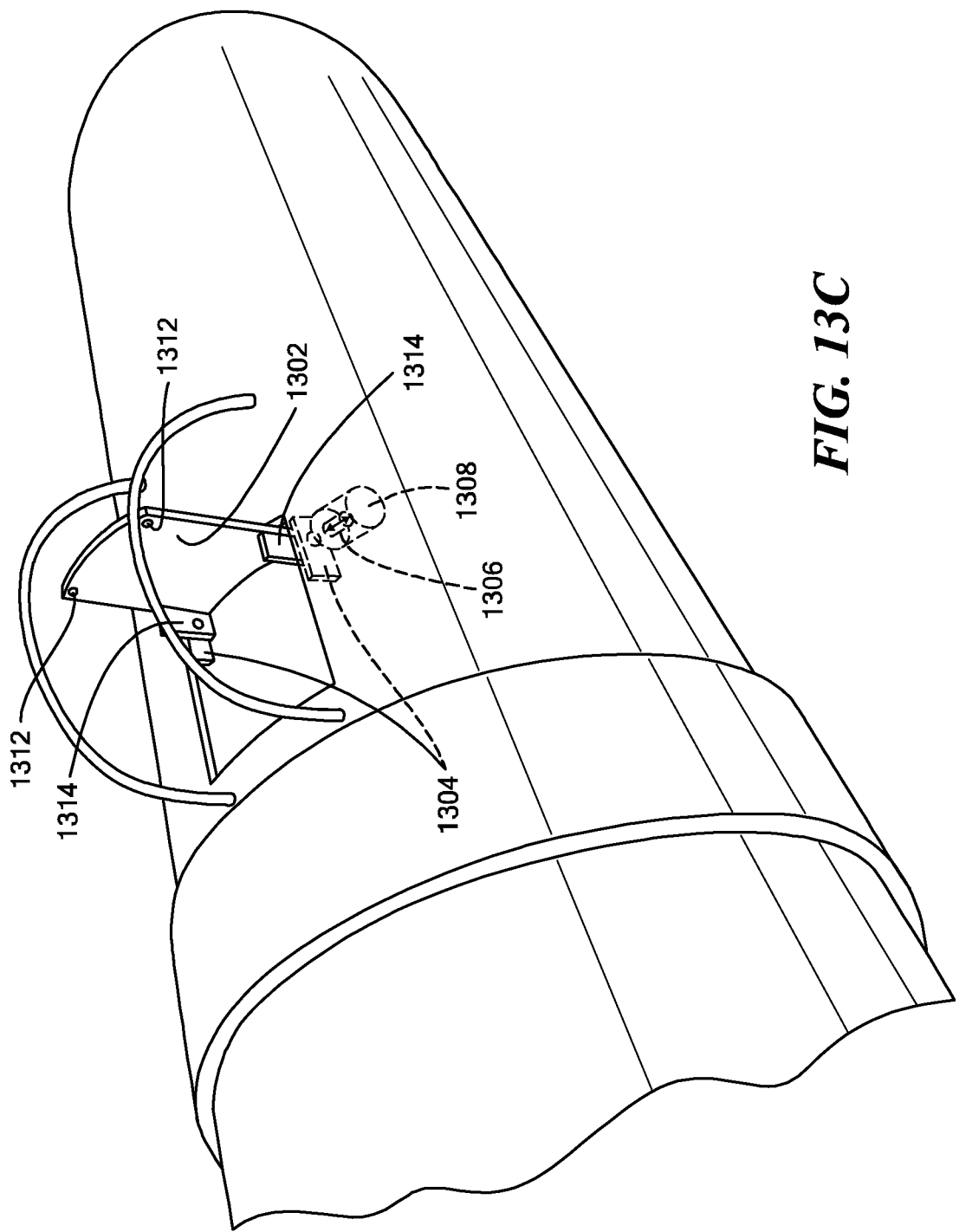

Buoyancy Calculations Table of Pressure Collapsing Air Space Volume and Resulting Net Buoyancy

| Transporter Buoyancy Calculator Part | Volume cu feet | Air weight | Displaced weight | Wet weight | |
|---|---|---|---|---|---|
| Bell Housing assembly | n/a | 151 | | 57.38 | |
| Misc hardware/ air plumbing | | | | 50 | |
| Motor | | 25 | | 25 | |
| Gear | 0.25 | 80 | | 80 | |
| Drum | 0.25 | 70 | | 70 | |
| 190m 1/4 wire rope | 0.5 | | | 18 | |
| Frame, aluminum | 0.5 | 100 | | 38 | |
| Low shroud, alum | n/a | 20 | | 7.6 | |
| Battery in Box 1 | 0.6 | 116 | 42 | 74 | |
| Battery in Box 2 | 0.6 | 116 | 42 | 74 | |
| Battery in Box 3 | 0.6 | 116 | 42 | 5 | |
| Battery in Box 4 | 0.6 | 116 | 42 | 5 | |
| Air Tank 1 80cu ft | 0.52 | 31.6 | 33.28 | -1.68 | |
| Air Tank 2 80cu ft | 0.52 | 31.6 | 33.28 | -1.68 | |
| Controller Housing Empty | 1.48 | 34 | 94.72 | -60.72 | |
| Controller Internal Components | n/a | | | 35 | |

| | | | | |
|---|---|---|---|---|
| Air weight | 1007.2 980 lbs air | | Xporter Float 250 lbs. 25"x44" | Antenna Float 170 lbs. |
| Volume of components: | 6.42 | | | |
| Gross Volume of Bell Housing | 14.2 | | | |
| Net Volume: | 8.3 8.3 measured | | | |
| Total Net Weight: | | 474.9 | | |
| Max Gross Buoyancy of Bell Housing space: | | 531.2 | | |
| Net Buoyancy Full of Air: | | 56.3 | 306.3 | |
| Min Gross Buoyancy of Bell Housing space 1/2 (20m depth): | | 265.6 | | |
| Net Buoyancy 1/2 Air: | | -209.3 | 40.7 | |
| Min Gross Buoyancy of Bell Housing space 1/4 (40m depth): | | 132.8 | | |
| Net Buoyancy 1/4 Air: | | -342.1 | -92.1 | 77.9 |
| Min Gross Buoyancy of Bell Housing space 1/5 (50m depth): | | 106.24 | | |
| Net Buoyancy 1/5 Air: | | -368.66 | -118.66 | 51.34 |
| Min Gross Buoyancy of Bell Housing space 1/9 (90m depth): | | 29.51111 | | |
| Net Buoyancy 1/9 Air: | | -445.389 | -195.4 | -25.4 |
| Min Gross Buoyancy of Bell Housing space 1/20 (200m depth): | | 26.56 | | |
| Net Buoyancy 1/20 Air: | | -448.34 | -198.34 | -28.34 |

FIG. 14

COVERT DATA DELIVERY SYSTEM FOR SUB-SURFACE OCEANOGRAPHIC MOORINGS

CROSS REFERENCE TO RELATED APPLICATIONS

This application claims priority to and benefit of U.S. Provisional Application No. 63/204,565 entitled "Covert Data Delivery System for Sub-Surface Oceanographic Moorings" (filed Oct. 13, 2020), which is incorporated herein by reference in its entirety.

BACKGROUND

Transmission of underwater oceanographic instrument data from moored surface buoys is common practice with several standardized methods used to achieve acceptable performance. Conventional data transmitting buoy systems utilize a continuously floating buoy on the ocean surface connected to a mooring data cable and anchored to the seabed.

Despite success designing surface buoys for survival against harsh environmental conditions, vandalism is a problem for permanently visible buoys in many regions around the globe. Additionally, surface buoys are not desirable for surveillance applications but the need for data recovery from underwater instruments remains.

SUMMARY

One aspect of the present disclosure is directed to a system and method of linking a surface transmitter to one or more sub-surface data-collection instruments by way of a vessel, or submersible housing, that is controlled to move from a lower, parked position in the water column to a higher, transmit location in the water column. The system is capable of remaining fully submerged when data transmission is not occurring and then exposing a transmitter antenna above the water surface for short time intervals for data transmission.

Exemplary embodiments include a system for delivering instrument data or an alert message from anchored underwater mounted instruments, with the system including automated control electronics and a motorized component having a motor and length of cable or jacketed wire rope, that operate to raise and lower the submersible housing within the water column. The jacketed wire rope can also act as a data link. The system can further include data collection and processing electronics, and a tethered transmitter buoy for data transmission.

A feature used in exemplary embodiments is a device that uses compressed gas (e.g., air), automatically injected and managed within an open and contained space, to provide protection of motor components from seawater contact, bio-fouling, and galvanic corrosion, as well as to regulate buoyancy of the device.

Another feature of exemplary embodiments are dual pressure sensors, used to accurately control the device payout and retraction of jacketed wire rope or cable, using multiple pressure measurements, e.g., two simultaneously read measurements from different locations in the water column, correlating to depth within the water column.

A further aspect of the present disclosure is directed to a braking device used to slow a submersible housing or other object, with the braking device including a door and a locking piston that prevents retraction or closing of the door until a certain depth in the water column has been reached.

An exemplary embodiment of the present disclosure includes a system for deploying a transmitter to a water surface from a sub-surface location, the system including: a main vessel having a main vessel housing having a longitudinal axis and an inner chamber; a sub-surface attachment point; a bellhousing having an open end and a sealed end, wherein the bellhousing is disposed within the chamber of the main vessel housing and configured to retain air in its sealed end when the main vessel housing is oriented in the water column with the longitudinal axis substantially vertical such that the sealed end of the bellhousing is closer to the water surface than the open end; a data link (e.g., operative to send data according to an inductive modem and/or Ethernet protocol) connecting one or more sub-surface sensors to the main vessel; a motorized payout-and-retrieval system disposed within the bellhousing for deploying and retracting a length of cable connecting the bellhousing to the sub-surface attachment point; a surface transmitter operative to transmit electromagnetic signals and connected to the main vessel housing by an electromechanical (EM) cable, wherein the EM cable is operative to transfer signals from the main vessel to the surface transmitter; and a system controller operative to control the motorized payout-and-retrieval system to raise and lower the main vessel within the water column from a parked position in which the surface transmitter is below the water surface to a transmitting position in which the surface transmitter is at the water surface and operative to transmit data from the one or more sensors.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 9 includes FIGS. 9A and 9B, which shown an example transmitter buoy with spherical flotation collar, antenna, and mechanical fish-line cutter according to the present disclosure.

FIG. 13 includes FIGS. 13A, 13B, and 13C, which show an example of a water brake according to the present disclosure; and FIG. 14 is a buoyancy-calculation table for an embodiment of the present disclosure.

DETAILED DESCRIPTION

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. What follows is illustrative, but not exhaustive, of the scope of the inventive subject matter.

Described embodiments provide a system and method of sending instrument data from a sub-surface activity, such as data collection by one or more sensors, to another location, e.g., a satellite, a ground-based location, a vessel, etc., with minimal time exposure and minimal visibility of any system components at the water surface. Components of exemplary embodiments of the inventive technology include a motorized payout-and-retrieval system or device (or, means for payout-and-retrieval), an air injection device, and a water-level sensing with automation control that together can be used to move a vessel, connected to an antenna, from a position in the water column in which the antenna is below the surface to a higher position in which the antenna is at or above the surface for data transmission.

Figure 1:
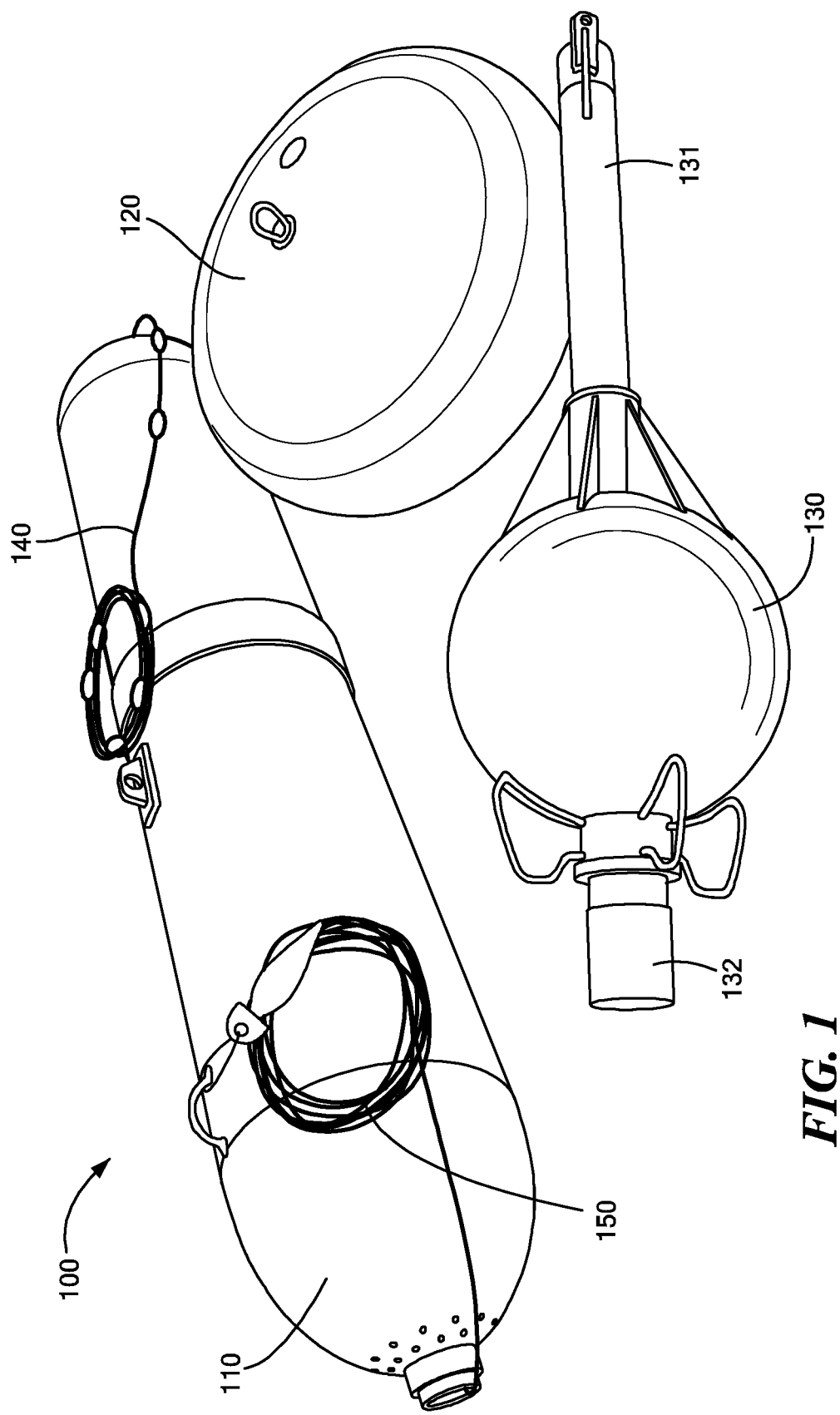
FIG. 1 is a perspective view of major components of an example system according to the present disclosure.

FIG. 1 depicts an example of a system 100 for linking a surface transmitter 131 to one or more sub-surface data-collection instruments according to the present disclosure. System 100 includes a vessel 102 having a main vessel housing 110 that is connected to a sub-surface attachment point 120, e.g., a sub-surface buoy anchored to the seafloor or other structure, and a transmitter buoy 130 that includes the surface transmitter 131 and an antenna 132. An electromechanical (EM) cable 140 can be used to connect the main vessel housing to the transmitter buoy 130. A cable or jacketed wire rope 150 can be used to connect the main vessel housing to the sub-surface attachment point 120. The cable 150 is also used as a data link to transmit data from one or multiple sub-surface sensors or instruments (e.g., pressure sensors, temperature sensors, salinity sensors, sonar transducers, and/or the like) to the main vessel housing 110 for processing and then transmission by the antenna, as described in further detail below. In exemplary embodiments, vessel 102 has a hydrodynamic shape, such as shown in FIG. 1, that provides a low drag coefficient in the vertical direction the vessel 102 travels within the water column.

Figure 2C:
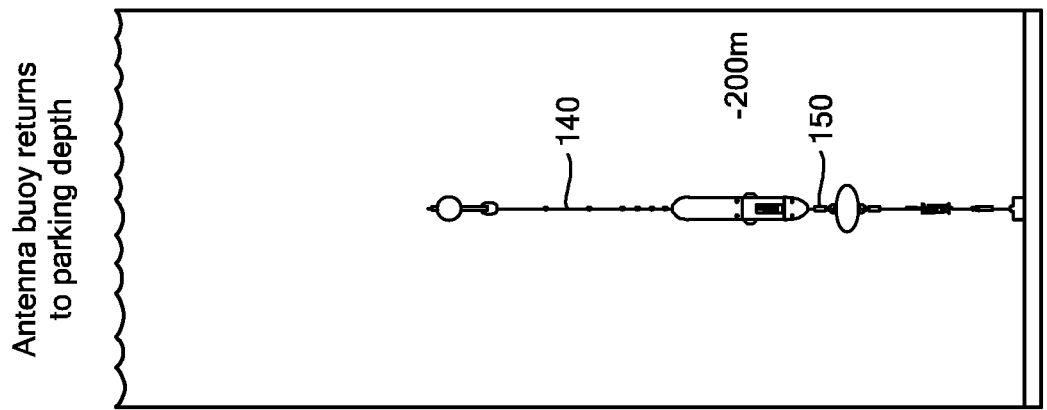
FIG. 2 includes FIGS. 2A, 2B, and 2C, which are diagrams showing operation of the system of FIG. 1 in parked and transmitting positions.
Figure 2B:
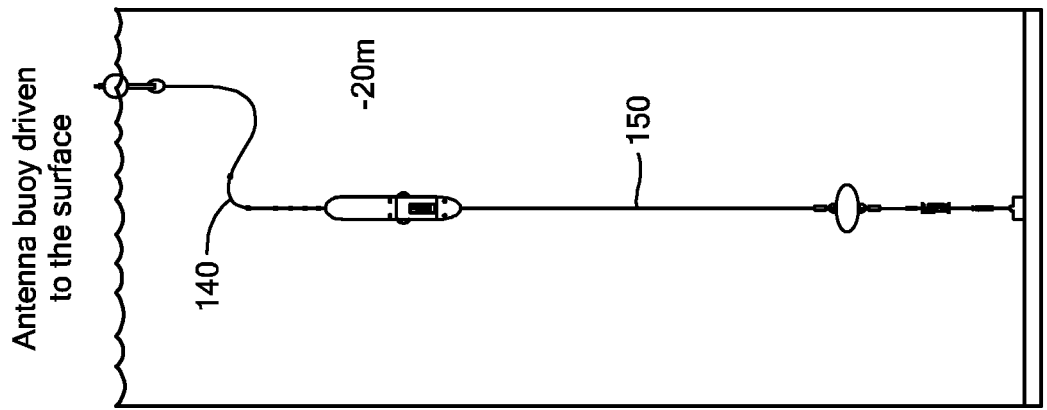
Figure 2A:
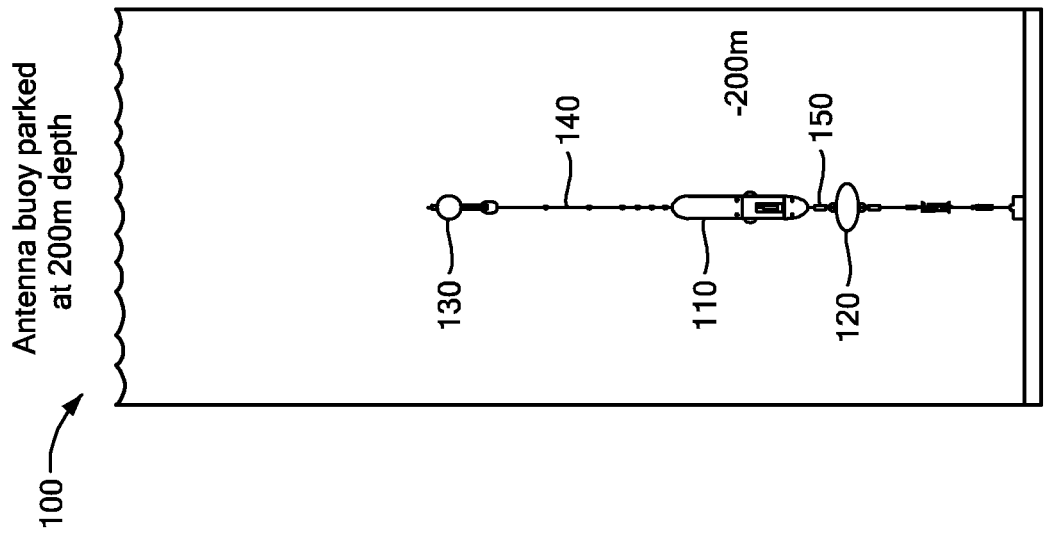

FIG. 2, includes FIGS. 2A, 2B, and 2C, which show operation of system 100 of FIG. 1. Main vessel housing 110 includes a motor (e.g., shown in and described for FIG. 6B) for paying out and retrieving the jacketed wire rope or cable 150 connecting the housing 110 to the attachment point (e.g., seafloor buoy), allowing the main vessel 102 to effectively raise and lower itself in the water column. The main vessel housing 110 operates as a motorized buoyant device anchored to the seabed or a structure that is anchored to the seabed. Unwinding of an internal storage reel of jacketed wire rope 150 will raise the main vessel housing 110 in the water column, and consequently the attached (by EM cable 140) buoyant transmitter buoy 130 to the ocean surface for transmitting data. Motorized winding of the jacketed wire rope 150 back on to the internal storage reel lowers the housing 110 and transmitter buoy 130 back down below the water surface and out of visible sight.

In FIGS. 2A and 2C, the main vessel housing 110 is in a first position (or parked position) such that connected antenna is held below the surface, as shown. In FIG. 2B, main vessel housing 110 is in a second, different position (or transmit or transmitting position), higher in the water column such that the antenna connected to the transmitter buoy is above the water surface and able to transmit data.

Figure 3C:
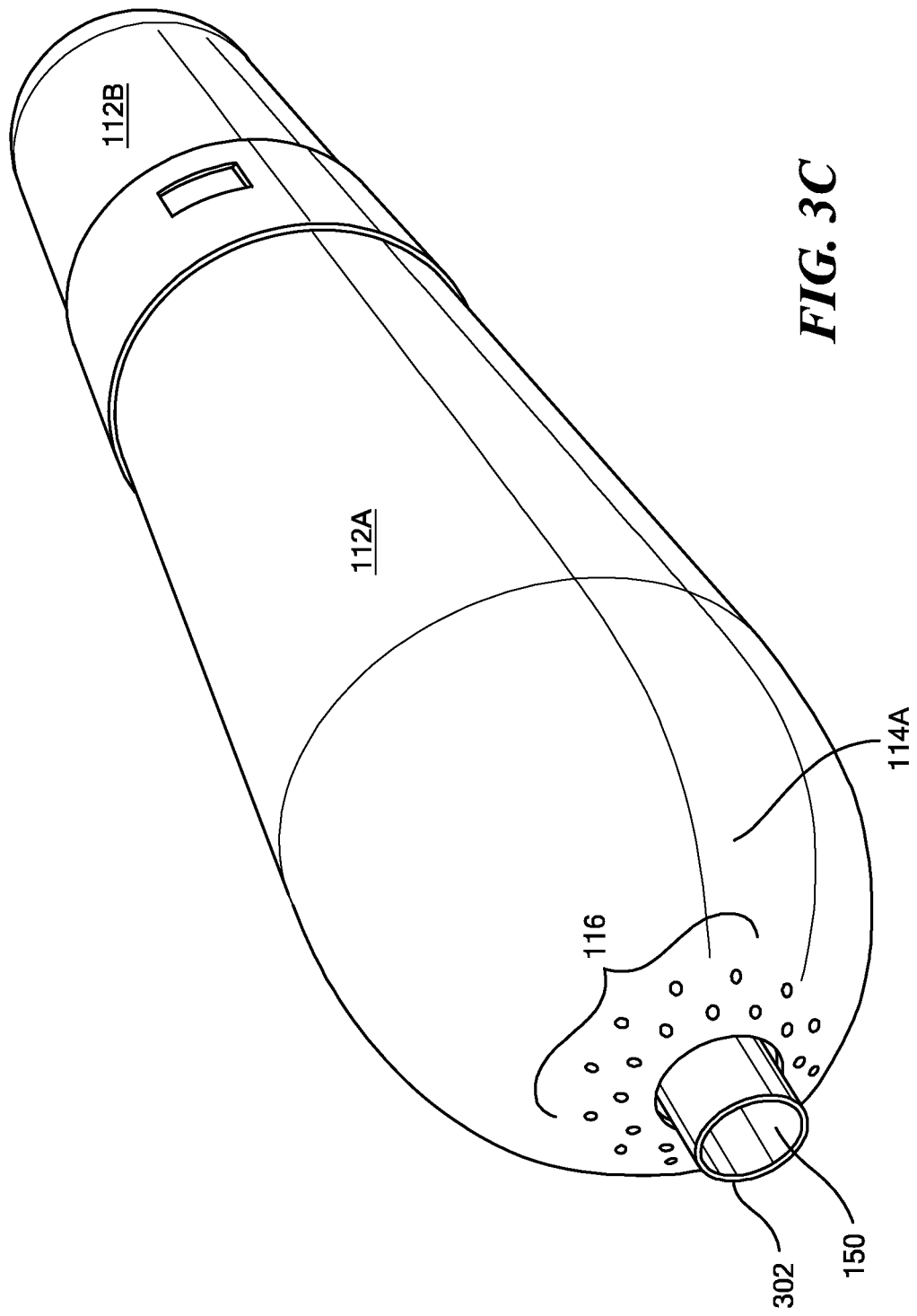
FIG. 3 includes FIGS. 3A, 3B, and 3C, which are side and perspective views of an example of a main vessel housing and bellhousing according to the present disclosure.

FIG. 3 includes FIGS. 3A, 3B, and 3C, which are perspective views that show the main vessel housing 110 of FIG. 1 having a first ("lower") section 112A and a second ("upper") section 112B. Here, the terms "lower" and "upper" are used for explanatory purpose and refer to the relative positioning when the main vessel housing 110 is deployed for operation in the water column.

FIG. 3B shows the lower section 112A while FIG. 3C shows the upper section 112B. Referring to FIG. 3A, lower section 112A is shown holding a bellhousing 200. As described in further detail below, bellhousing 200 can be used to hold the system's control electronics, a storage reel of jacketed wire rope (150), a motor for paying out and retrieving the jacketed wire rope, and one or more compressed-gas tanks for adjusting a volume of gas within the bellhousing 200.

Referring to FIG. 3C, lower section 112A may have a terminating portion, e.g., formed as a cone 114A. Cone 114A has an aperture through which a portion 302 of an internal frame (e.g., frame 300 of FIG. 5) held by bellhousing 200 and jacketed wire rope 150 can pass. Cone 114A may optionally have one or more apertures 116 to allow water to flow in and out of lower section 112A and to facilitate desired positioning of the main vessel housing 110 when deployed in the water column.

The upper section 112B forms a chamber that can be filled with buoyancy material. When the upper section 112B contains a buoyancy material it can provide a fixed buoyancy amount to maintain an upright vertical orientation of the main vessel housing 110 to facilitate capture and maintenance of an air pocket within the bellhousing section 200. The fixed buoyancy amount is preferably enough to keep the vessel (including main vessel housing with bellhousing and included components) positively buoyant at its maximum parking depth even if the air injection system fails. A syntactic buoyancy material such as syntactic foam is used in exemplary embodiments. Syntactic foams, which are free from corrosion, are composite materials synthesized by filling a metal, polymer, or ceramic matrix with hollow particles, or micro-balloons. A buoyancy calculation table for an exemplary embodiment is shown in FIG. 14 and described in further detail below.

Figure 4A:
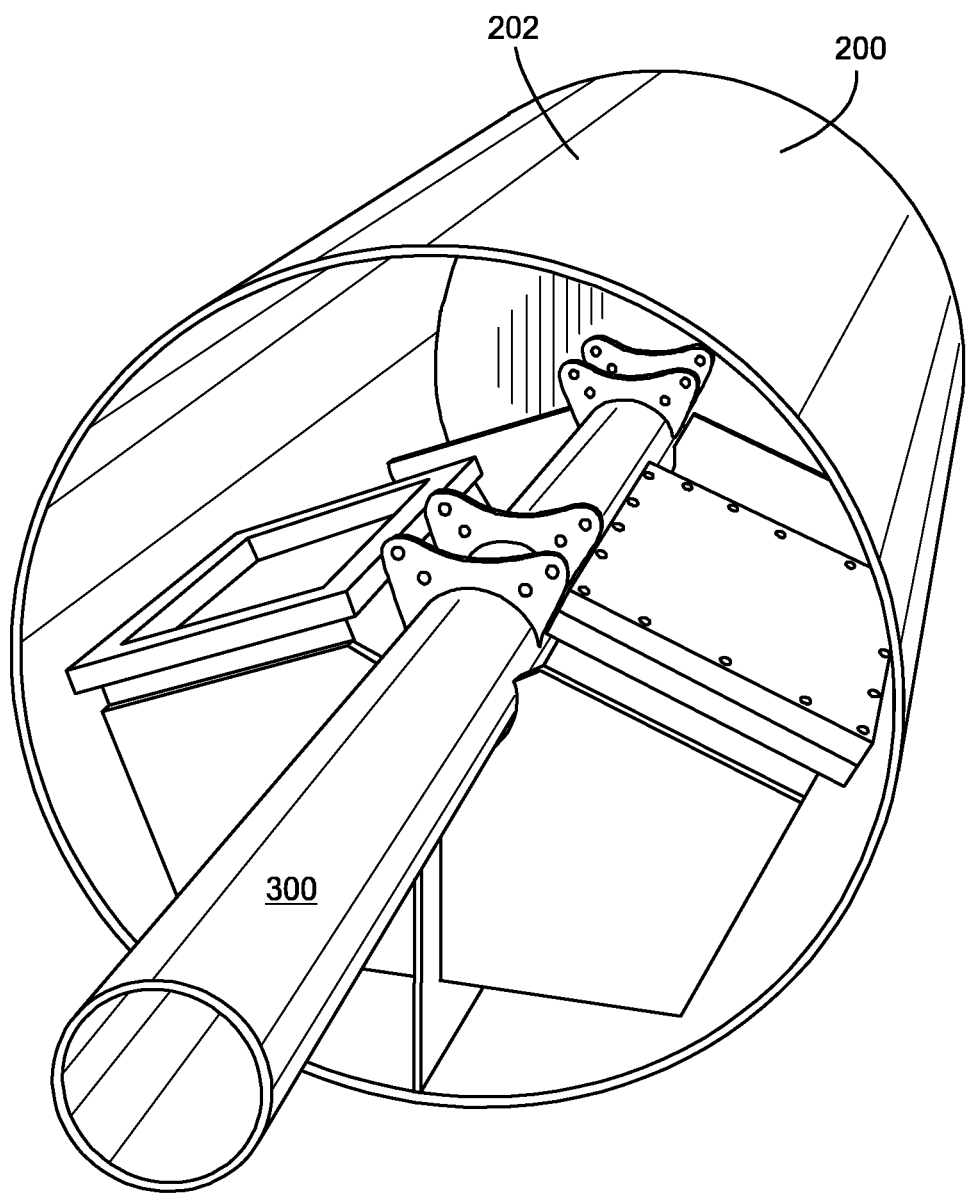
FIG. 4 includes FIGS. 4A, 4B, and 4C, which show details of the bellhousing of FIG. 3.
Figure 4B:
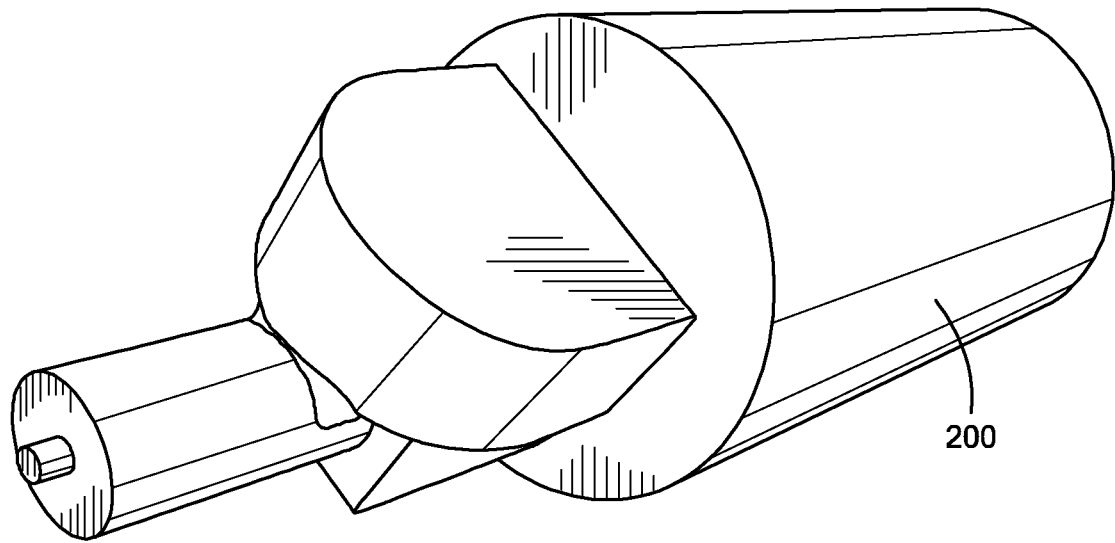
Figure 4C:
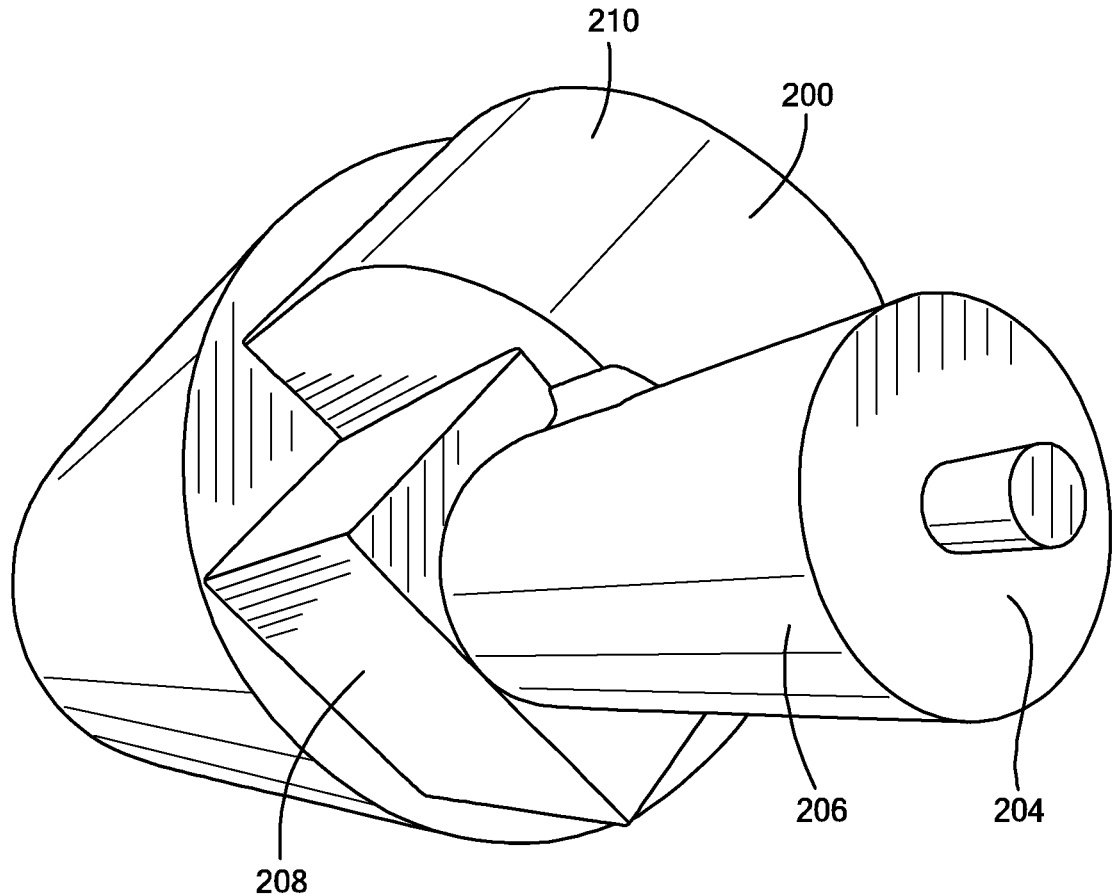

FIG. 4, includes FIGS. 4A, 4B, and 4C, showing bellhousing 200 of FIG. 2. Bellhousing 200 can be used within main vessel housing 110 to house an internal frame for holding control electronics, a compressed-gas system (described in further detail below), and motorized cable reel for payout and retrieval of cable (e.g., jacketed wire rope 150) according to the present disclosure.

As shown in FIG. 4A, bellhousing 200 includes an open end 202. When the bellhousing 200 is deployed in a vertical orientation in the water column, it provides a chamber to contain air introduced from initial deployment and injected compressed air (or other gas) to regulate and maintain a minimum volume of air space. The volume of air space withing the bellhousing 200 serves both to provide an air chamber for the various system components that benefit from being in the air chamber (see, e.g., the payout-and-retrieval system components, proximity sensor, pressure sensor, and air injection port of FIG. 6) and to facilitate adjustment of buoyancy of the main vessel housing 110.

As main vessel housing 110, holding bellhousing 200, descends in the water column, the initial air volume held in bellhousing 200 collapses due to ambient pressure increasing with increasing depth as the vessel travels deeper underwater. Injections of air (or other stored gas) can be triggered by a water level float switch activated using magnetic proximity sensor (see FIG. 6). The bellhousing upper end 204 is fabricated (e.g., using TIG welding) with reduced open space surrounding the motor and gearbox components to slow down rate of water level rise during descent, because the chamber cavity is physically smaller at the top end 204 (e.g., in cross-sectional area) when compared to the portion of the bellhousing 200 near the open end 202. This reduced volume at upper end 204 is illustrated by portions of the bellhousing that are designed to surround the motor, gear box, and cable reel mounted to the internal frame 300, i.e., bellhousing portions 206, 208, and 210. The combined volume of bellhousing portions 206, 208, and 210 is considerably less than the volume of a cylinder having the diameter of the open end 202 and extending along the longitudinal extent of the three bellhousing portions, as can be seen in FIGS. 4B and 4C. Main vessel housing 110, bellhousing 200, and/or other system components can be made of suitable materials, including, but not limited to, suitable aluminum alloys that experience low corrosion rate when submerged in salt water, e.g., 6061, 5052, or the like.; of course, the present disclosure is not limited to use of aluminum, and other alloys and metals (e.g., steel, titanium, etc.) or materials can be used in alternate embodiments. For example, in some embodiments, carbon fiber can be used for components of system 100, as carbon fiber is typically lighter and stronger than aluminum.

Figure 5A:
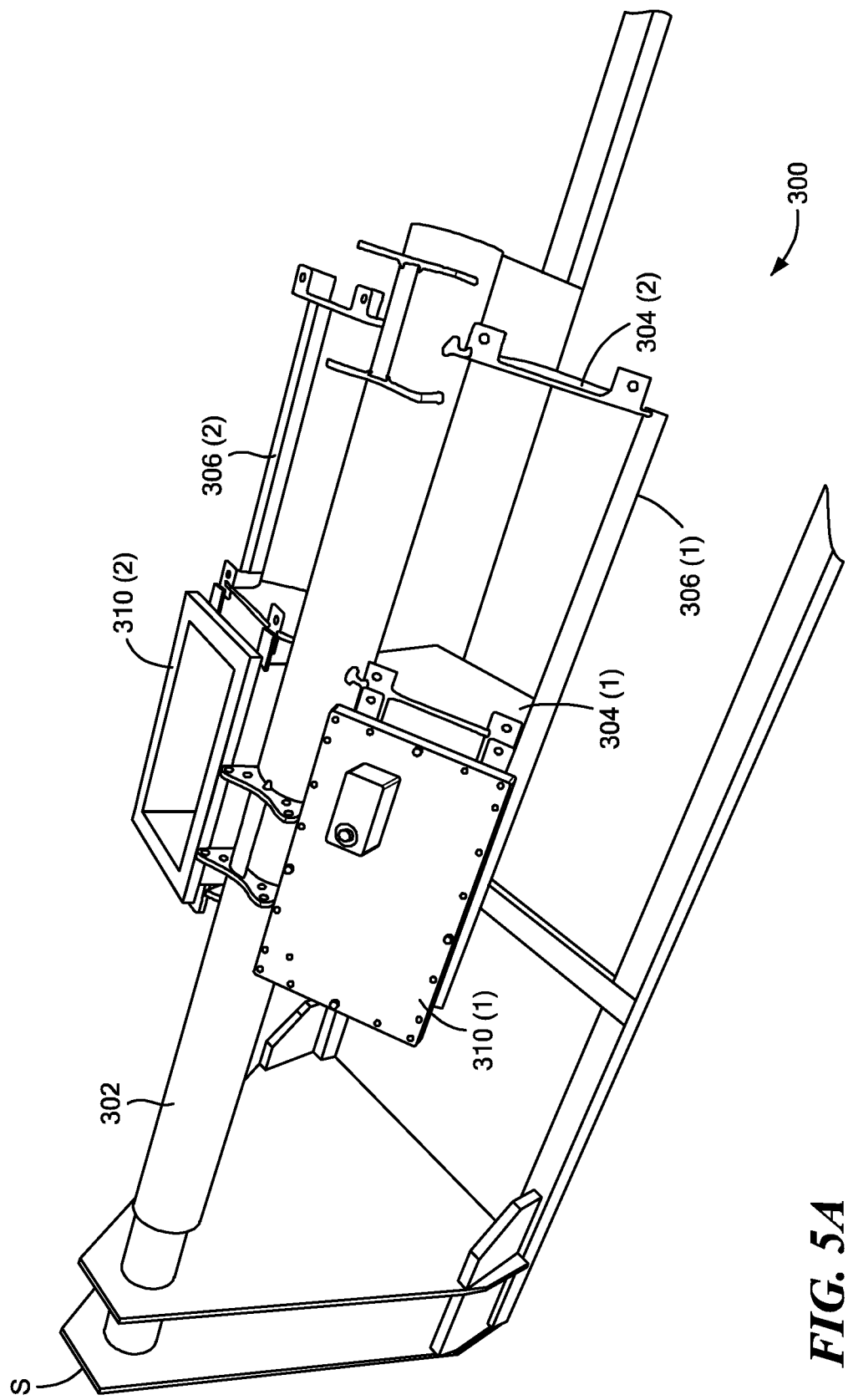
FIG. 5 includes FIGS. 5A, 5B, and 5C, which show perspective views of an example of an internal frame with battery housings according to the present disclosure.
Figure 5C:
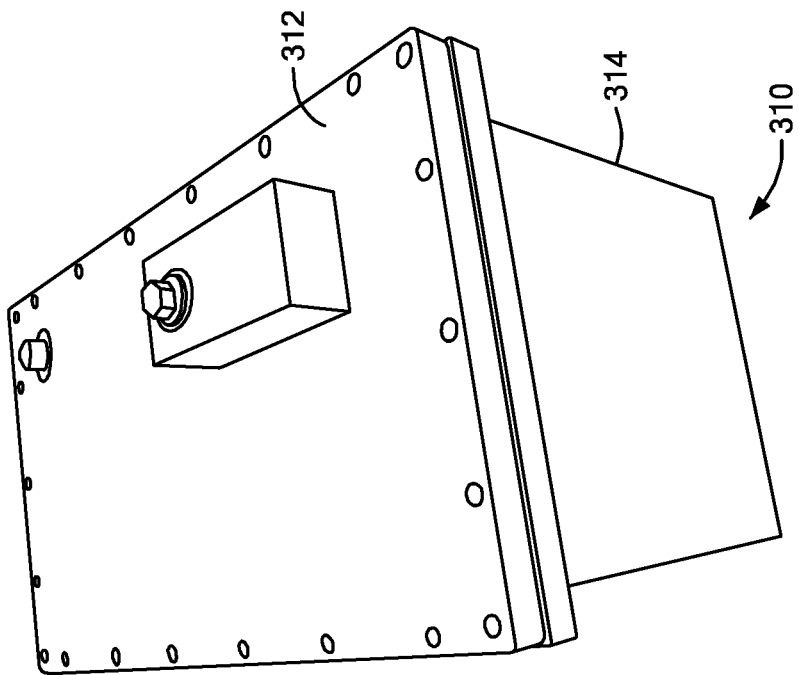
Figure 5B:
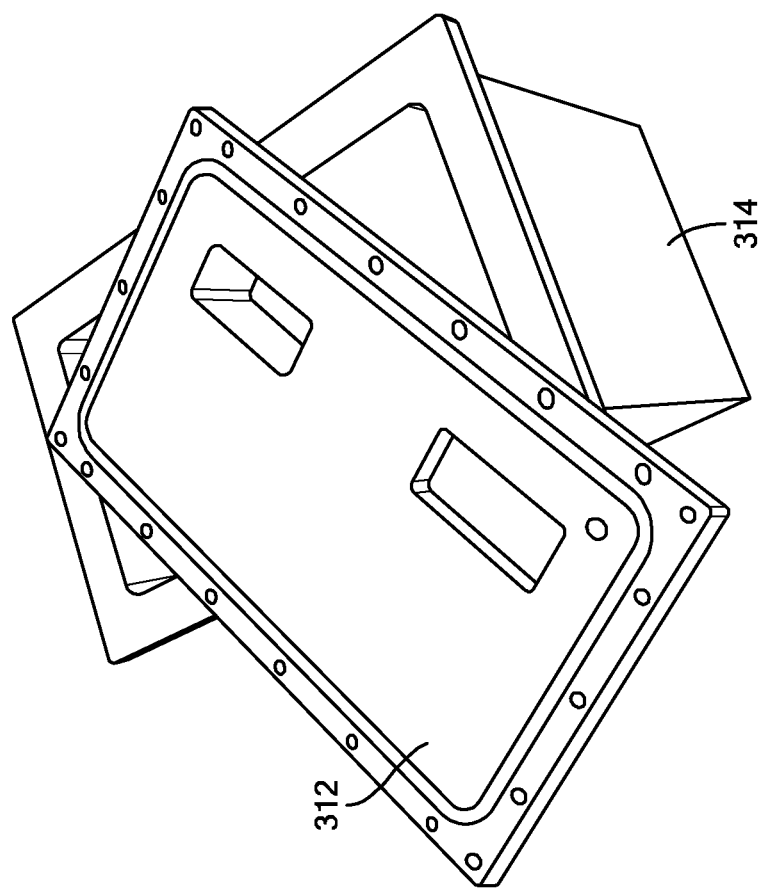

FIGS. 5A, 5B, and 5C are perspective views of an example of an internal frame 300 with battery housings 310(1)-310(2) according to the present disclosure. Frame 300 is used to hold system components withing bellhousing 200 and provides mounting provisions for battery housings 310(1)-310(2) and other system components such as an electronics housing, compressed-gas tanks, and a motorized payout-and-retrieval system having a motor, gear box, cable reel, and a water-level sensor (e.g., as shown in FIG. 6).

FIG. 5A shows frame 300 with battery housings 310(1)-310(2) attached and held on a frame stand S. Frame 300 includes an elongate member 302, e.g., hollow shaft, support flanges 304(1)-304(2), and side walls 306(1)-306(2), as shown. FIG. 5B is a perspective view of a battery housing 310 of FIG. 5A in an opened condition with a cover plate 312 removed from the battery housing body 314. A frame may have other configurations in alternate embodiments. As shown, in exemplary embodiments the battery housing is configured with a gasket for pressure sealing to facilitate keeping a battery inside the housing dry and/or at lower pressure than the exterior ambient pressure.

FIG. 5C is a perspective view of the battery housing 310 in a closed condition with the cover plate 312 attached to the battery housing body 314. As further shown in FIG. 5C, cover plate 312 can include a shaped cover 313 with connector 315 for a terminal of a battery.

Figure 6A:
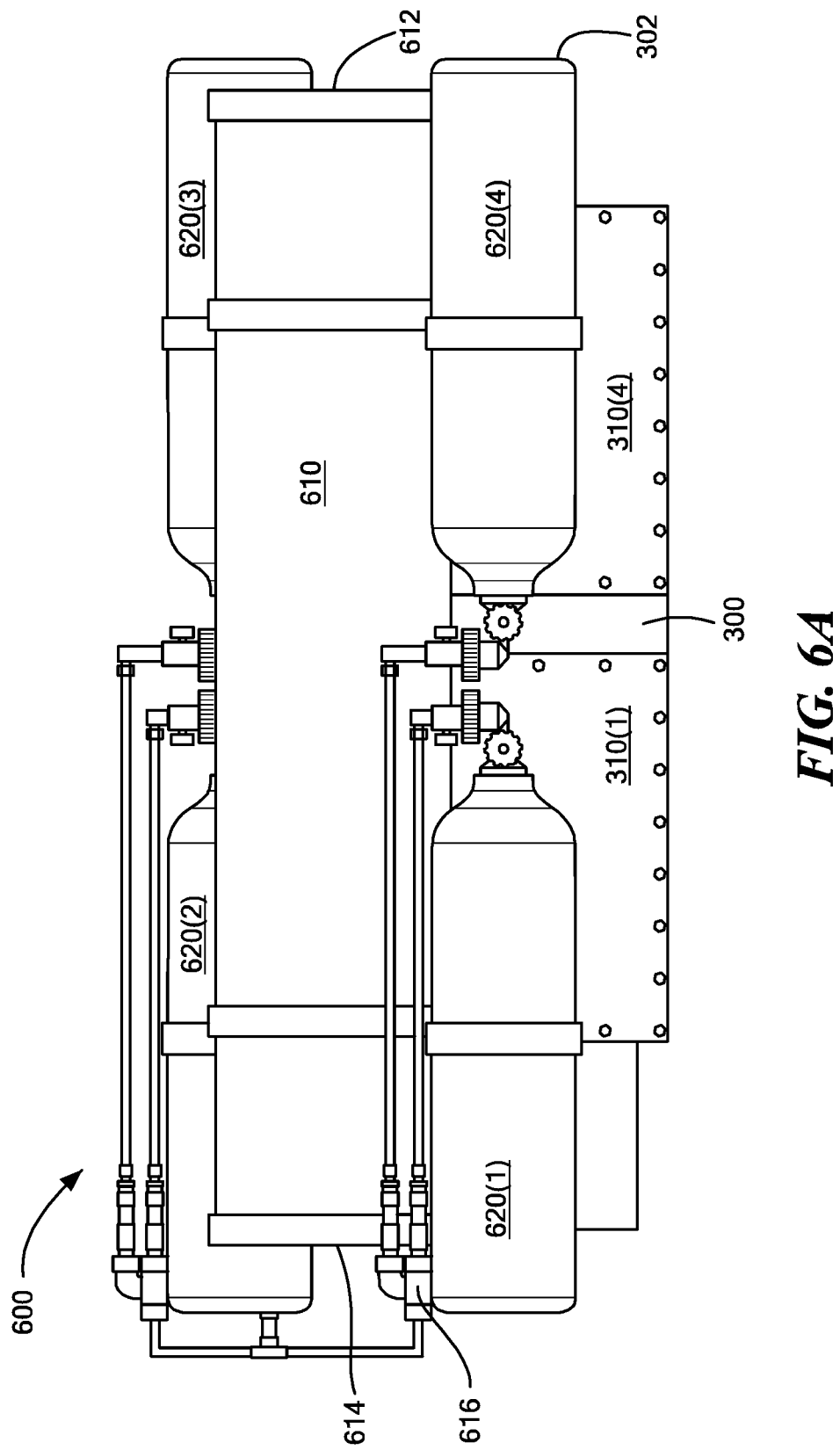
FIG. 6 includes FIGS. 6A, 6B, 6C, and 6D, which show an example of an electronics housing and compressed-air tanks mounted to the internal frame of FIG. 5.
Figure 6B:
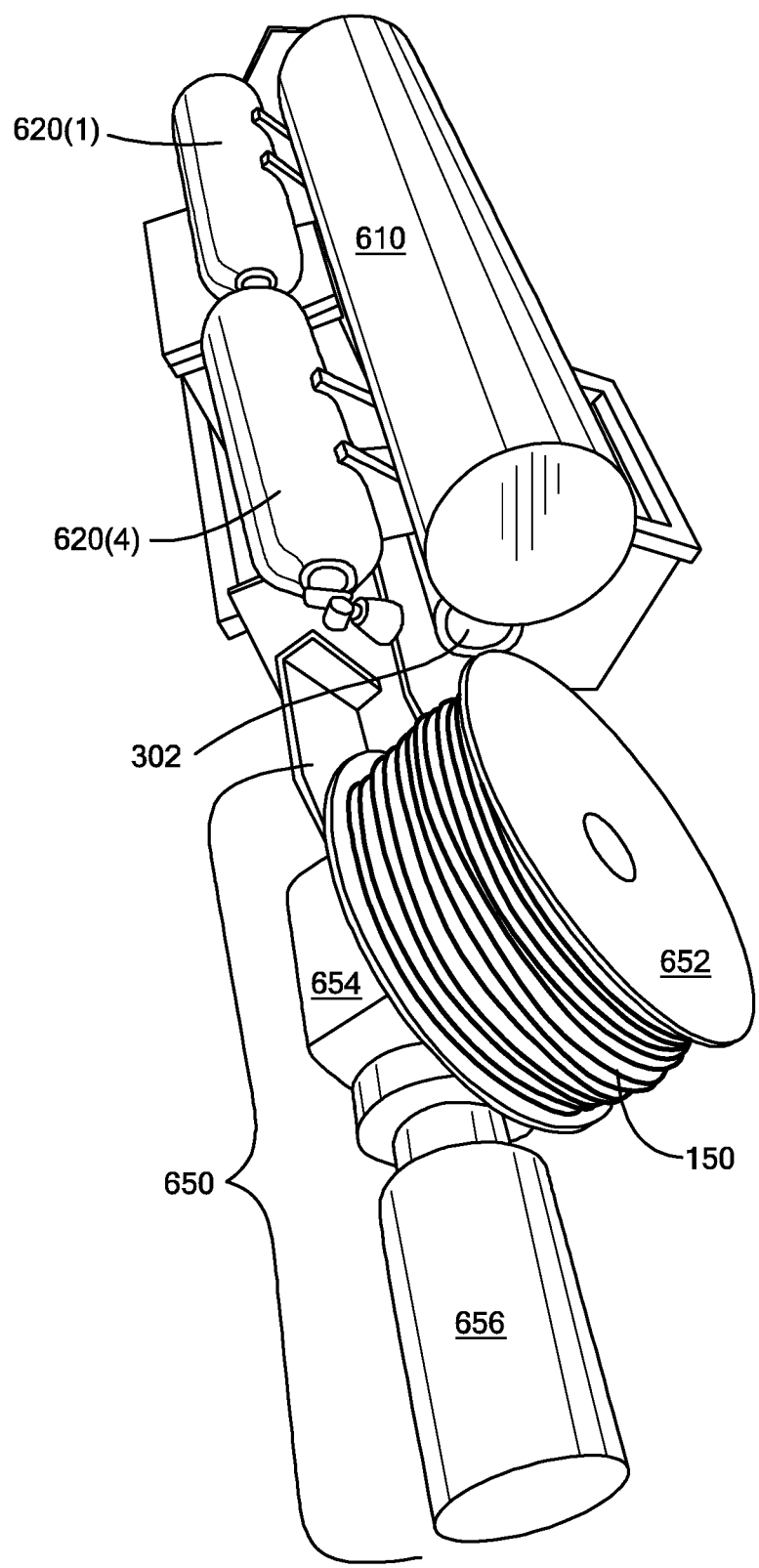

FIG. 6 includes FIGS. 6A, 6B, 6C, and 6D, which are perspective views of a mounted assembly 600 of system motor, air injection, and electronics components that are mounted on internal frame 300, e.g., within bellhousing 200, according to exemplary embodiments of the present disclosure.

As shown in FIG. 6A, assembly 600 includes an electronics housing 610 and one or more compressed-air tanks mounted to the internal frame 300 of FIG. 5A. Electronics housing 610 has first and second ends 612, 614. High-pressure air tanks 620(1)-620(4) with distribution lines 616 are additionally mounted to the frame 300. Injection port 617 allows compressed gas (e.g., air) from the tank(s) to be plumbed into the electronics housing 610, where it is then controlled by the electronics for specific length injections on demand into to lower section 112A. Four tanks 620(1)-620(4) are shown. Battery housings 310 are also mounted to the frame 300. Two battery housings 310(1) and 310(4) are visible in FIG. 6A. Pressure sensor 615 is located at one end 614 of the electronics housing 610 and is operative to sense pressure at the location of the electronics housing 610, e.g., inside the bellhousing 200 within main vessel housing 110 (P1 in FIG. 2). Pressure sensor 615 can be used by an internal electronic controller in the electronics housing (e.g., controller 1010 of FIG. 10) for raising and lowering of the main pressure vessel 110 in the water column. A portion of the wire real 652 and spooled cable 150 are shown, at left. Also shown is water level sensor assembly 670, described in further detail for FIGS. 6C-6D.

FIG. 6B shows further detail of the wire reel 652 with spooled cable 150 as mounted to the frame 300. Also shown coupled to internal frame 300 are gearbox 654 and motor 656 that operate together with the wire reel 652 and cable 150 as a motorized payout-and-retrieval system 650 (which may also be referred to or considered as a means for payout-and-retrieval) that pays out and retrieves cable 150. FIG. 6B further shows cable 150 running from reel 652 and entering a proximal end of frame member 302. In operation, e.g., with the vessel 102 deployed in the water column, cable 150 would exit the distal end of 302 (as shown in FIG. 1) for attachment to a lower attachment point (e.g., 120 in FIG. 2). In exemplary embodiments, as cable 150 is paid out from reel 652, the effective lever arm, between the point that cable 150 departs the reel 652 and the axle of the reel, is reduced because the amount of cable 150 on the reel is reduced. Similarly, when the cable 150 is retrieved or reeled in and the amount of cable 150 on reel 652 increases, the lever arm increases. This effect of a variable lever arm can facilitate raising and lowering the vessel in the water column. In exemplary embodiments, the jacketed wire rope 150 is used as both the pay-out and retrieval cable and as an inductive-modem signal link (data link) to carry instrument data to the control electronics. In such embodiments, the cable 150 carrying the signal can be a plastic jacketed (isolated from seawater) wire rope that is commonly used for sending signals underwater using an inductive modem (IM). In alternate embodiments, other data signal links may be utilized, e.g., Ethernet cable, optical fiber, or the like. The control electronics are linked with an EM cable (e.g., 140 in FIG. 2) to a transmitter buoy to send the data to a desired location, e.g., to a satellite, to a ground station, a vessel, etc., where the data can be processed and/or relayed to another location, e.g., delivered to a user's email account(s). In exemplary embodiments, EM cable 140 includes data transmission wires and aramid fibers as structural elements, e.g., Kevlar® and/or Spectra® fibers.

FIGS. 6C and 6D are perspective views of the water level sensor 670 assembly shown in FIG. 6A. Water level sensor assembly 670 includes one or more floats 672 (two are shown) that are configured on a rod movable within block 678 in response to water, e.g., present in bellhousing 200 when vessel 102 is deployed in the water column. Magnet 674 and magnetic proximity sensor 676 operate as a proximity switch to activate injection of compressed gas, e.g., as provided by tanks 620(1)-620(4).

Figure 7A:
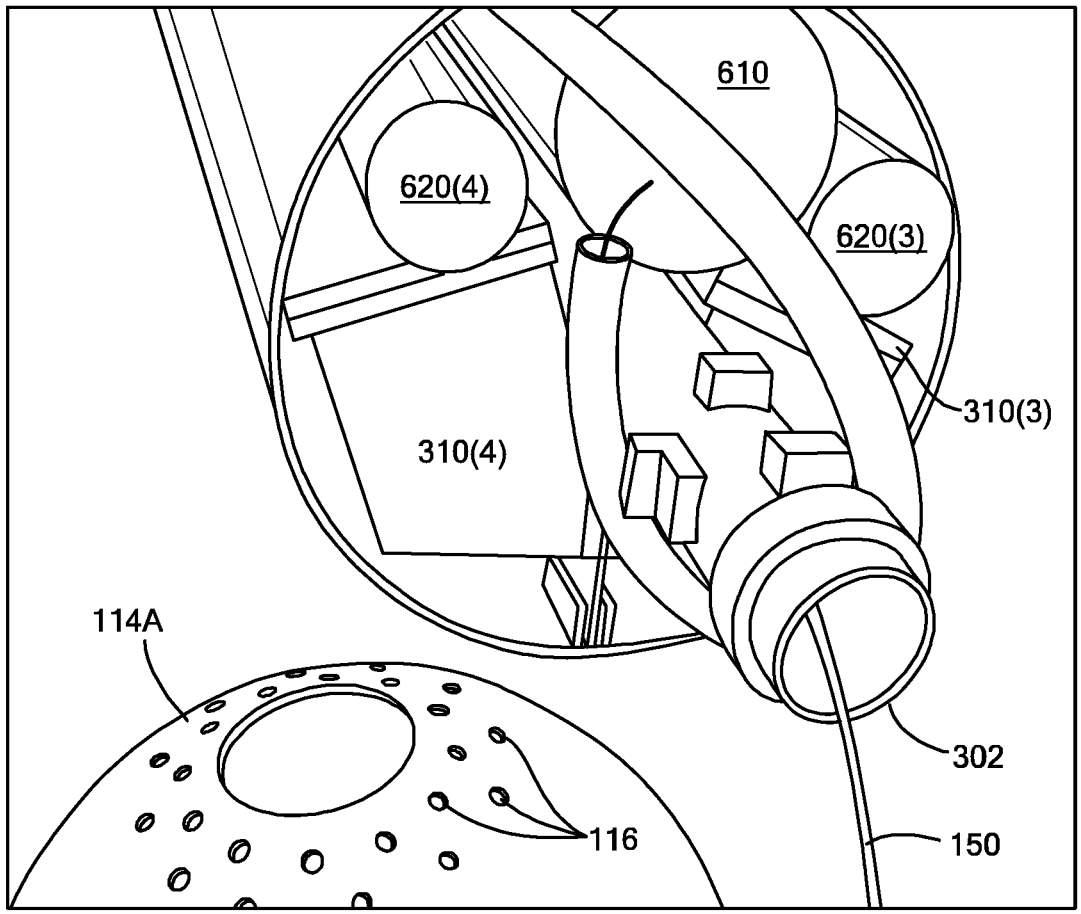
FIG. 7 includes FIGS. 7A and 7B, which show the assembly of FIG. 6 placed in the housing of FIG. 4.
Figure 7B:
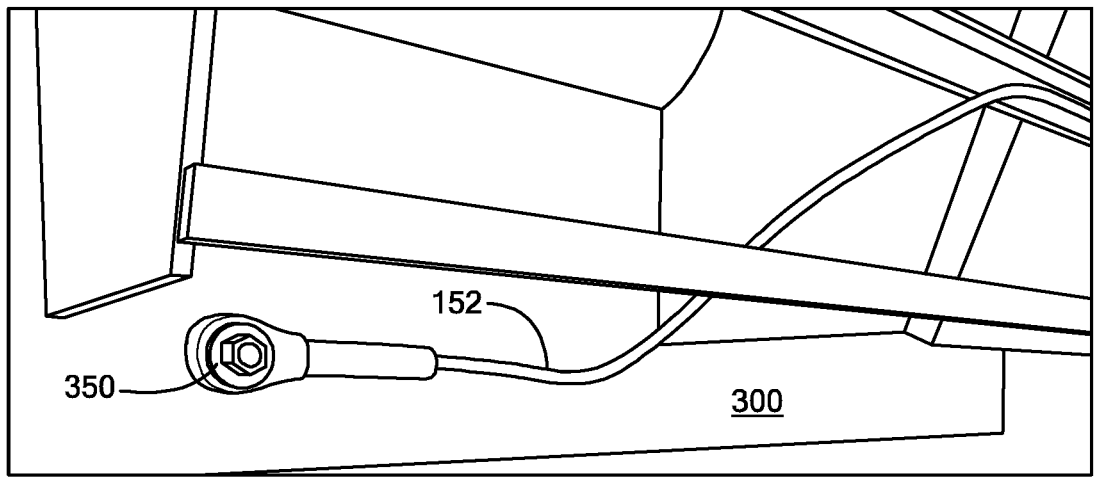

FIG. 7 includes FIGS. 7A and 7B, which show the mounted assembly 600 of FIG. 6 placed in the bellhousing 200 of FIG. 4. FIG. 7A shows a close-up view of the open end 202 of bellhousing 200 shown in FIG. 4A. Electronics unit 610, tanks 620(30-620(4), and battery housings 310(3)-310(4) are shown attached to frame 300. Frame element 302 is also shown extending from bellhousing end 202. Jacketed wire rope 150 is shown, extending from the open end of frame element 302.

FIG. 7B illustrates grounding of jacketed wire rope 150 to the frame 300 to form a seawater ground connection of the jacketed wire rope 150 to complete the inductive modem (IM) circuit loop.

Figure 8A:
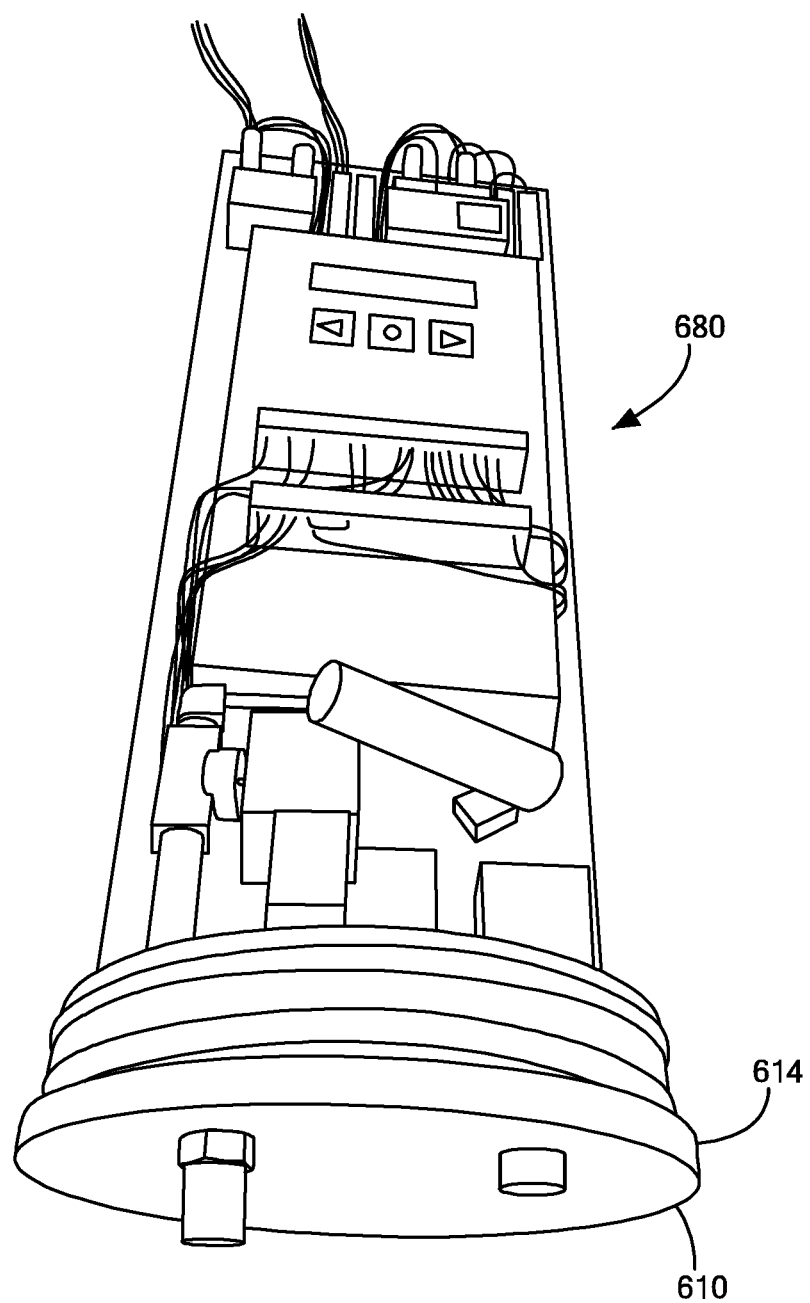
FIG. 8 includes FIGS. 8A, 8B, and 8C, which show the system electronics controller used in the electronics housing shown in FIG. 6.
Figure 8C:
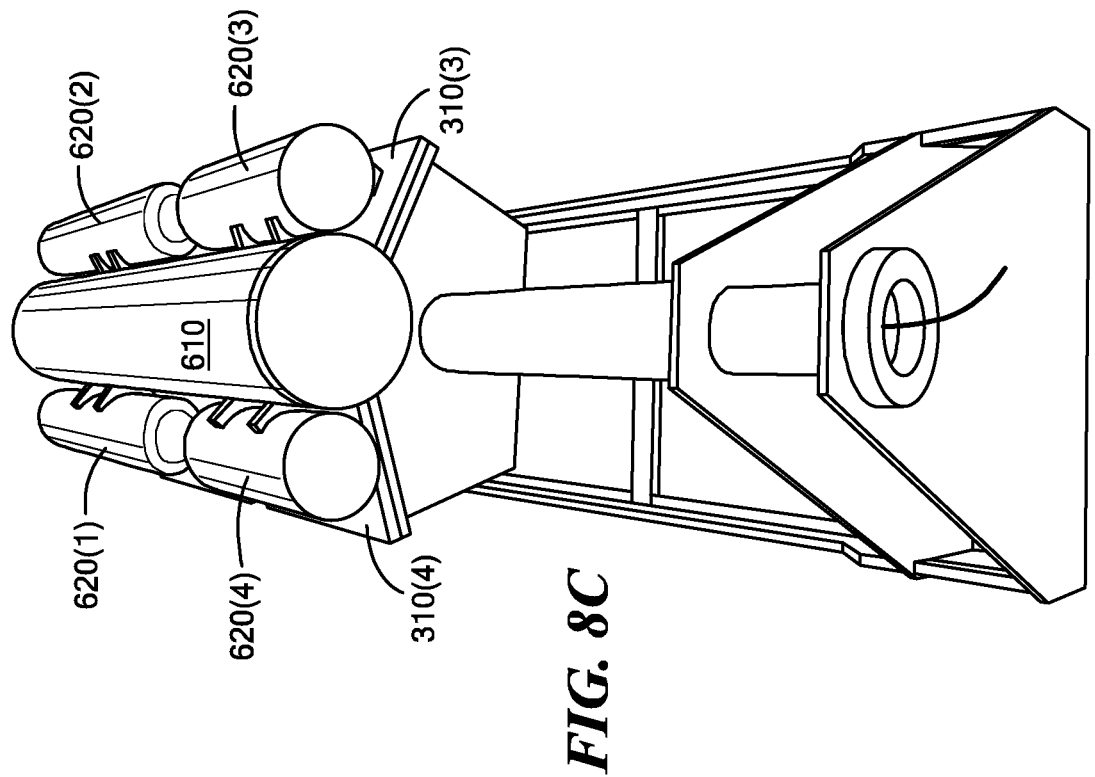
Figure 8B:
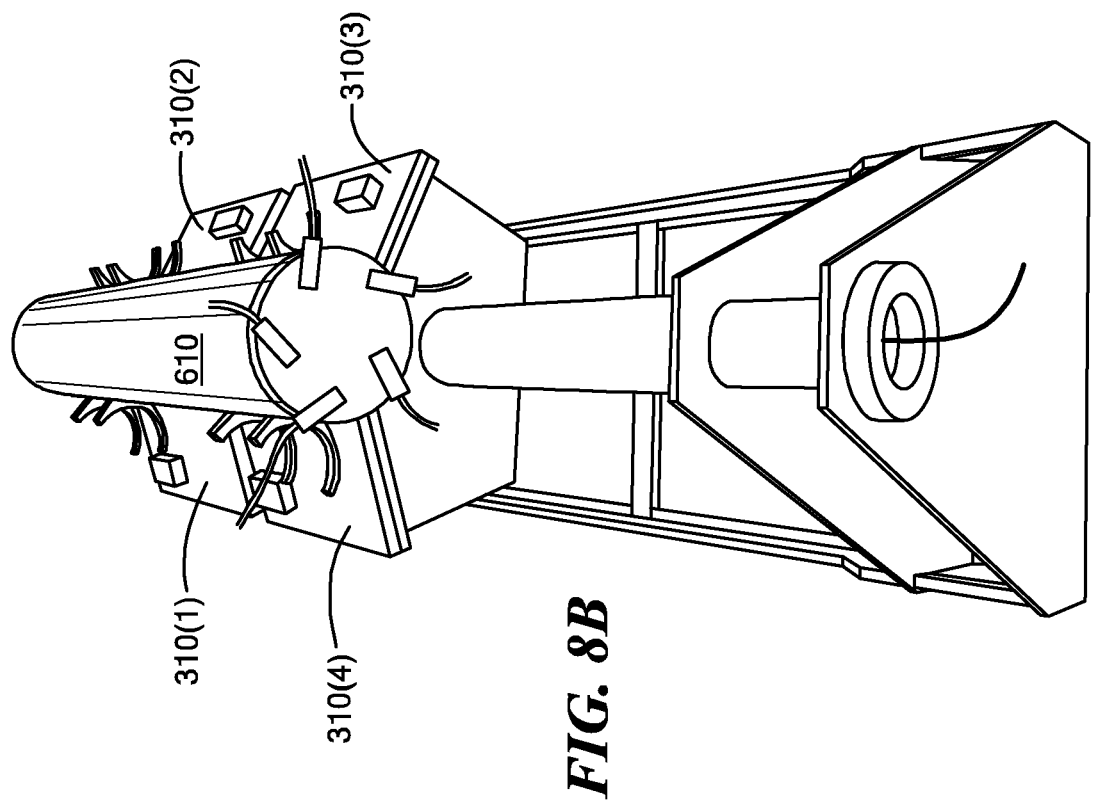

FIG. 8 includes FIG. 8A, FIG. 8B, and FIG. 8C, which show the mounted assembly 600 of FIG. 6 in successive stages of assembly. FIG. 8A is a perspective view of system electronics controller board 680 used in the electronics housing 610 shown in FIG. 6A. Electronics controller board is coupled to end 614 of electronics housing 610. FIG. 8B is a perspective view of the electronics housing 610 and system electronics controller of FIG. 6A installed on the internal frame 300 of FIG. 5, which is shown mounted on a test and assembly stand S. Battery housings 310(3)-310(4) are also show mounted to frame 300. FIG. 8C is a perspective view of the compressed-air tanks 620(3)-620(4) of FIG. 6 installed with the assembly shown in FIG. 8B.

FIG. 9 includes FIGS. 9A and 9B, which show an example of a transmitter buoy 900 according to the present disclosure. As shown in FIG. 9A, transmitter buoy 900 includes an antenna 902, a spherical flotation or buoyancy collar 904, a sealed housing 906 for transceiver/transmitter electronics, and an optional mechanical fish line cutter 908.

FIG. 9B is a perspective view showing transmitter electronics 910 coupled to the antenna 902. In some embodiments, transmitter electronics 910 can include a surface transmitter 131, e.g., as shown in FIG. 1, and/or transmitter/transceiver circuit 1200, e.g., as shown in FIG. 12B. In exemplary embodiments, antenna 902 and transmitter electronics 910 are configured to operate with the Iridium satellite network. Of course, in other embodiments, antenna 902 and transmitter electronics 910 can be configured to operate with one or more other networks, including wireless cellular networks and/or other types of satellite networks.

Figure 10:
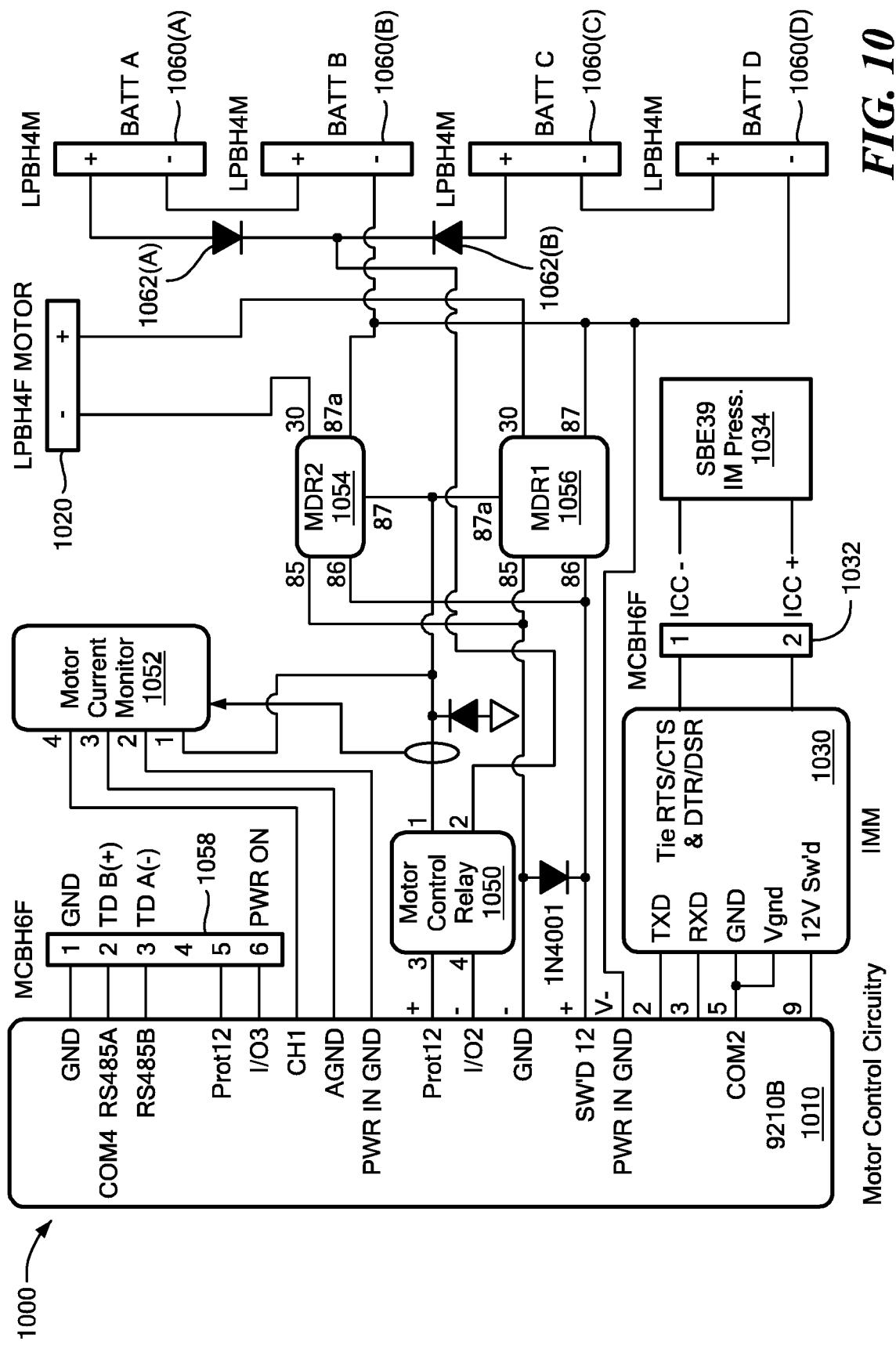
FIG. 10 is a schematic of an example motor control circuit according to the present disclosure.

FIG. 10 is a schematic diagram of an example motorized control system and inductive modem circuit 1000 for control of a system motor and input of instrument data, such as from a pressure sensor, according to the present disclosure.

Circuit 1000 includes controller 1010, which is used to control operation of system motor 1020 (e.g., motor 656 of FIG. 6). Controller 1010 is further connected to inductive-modulation modem 1030, which is shown connected to pressure sensor 1034 via connector 1032 and IM link (denoted by ICC+ and ICC−), e.g., provided via jacketed wire rope 150 of FIG. 1. Controller 1010 is connected to motor control relay 1050 and motor current monitor 1052. Relays 1054 and 1056, which are preferably multi-differential relays (MDRs), are also shown. Batteries 1060(A), 1060(B), 1060(C), and 1060(D) are present to supply power. Underwater electrical connector 1058 is also shown. In exemplary embodiments, controller 1010 is an XLite 9210B Datalogger & Controller (from Sutron Corporation). In exemplary embodiments, pressure sensor 1034 is a 209H10CPJG72402NN model (made available by Setra Systems, Inc.), which is a pressure sensor with integrated Inductive Modem (IM) interface, internal batteries, and memory.

With continued reference to FIG. 10, pressure sensor 1034 is indicated as being a pressure sensor remote from controller 1010. In exemplary embodiments, pressure sensor 1034 is used to measure pressure (P2) at or near the sub-surface attachment point 120 (FIG. 2). By monitoring sensed pressure P2 and controlling the position of the vessel 102 in the water column such that P2 is greater than (and in some embodiments, always greater than) the ambient pressure local to the vessel (P1), the controller 1010 can keep the vessel 102 higher in the water column than the lower attachment point 120. The controller 1010 can accordingly prevent the vessel 102 from colliding with or bottoming out against the lower attachment point 120 or nearby structure or terrain. In exemplary embodiments, P1 and P2 are sampled or sensed simultaneously for processing by controller 1010 (or 1110).

Figure 11:
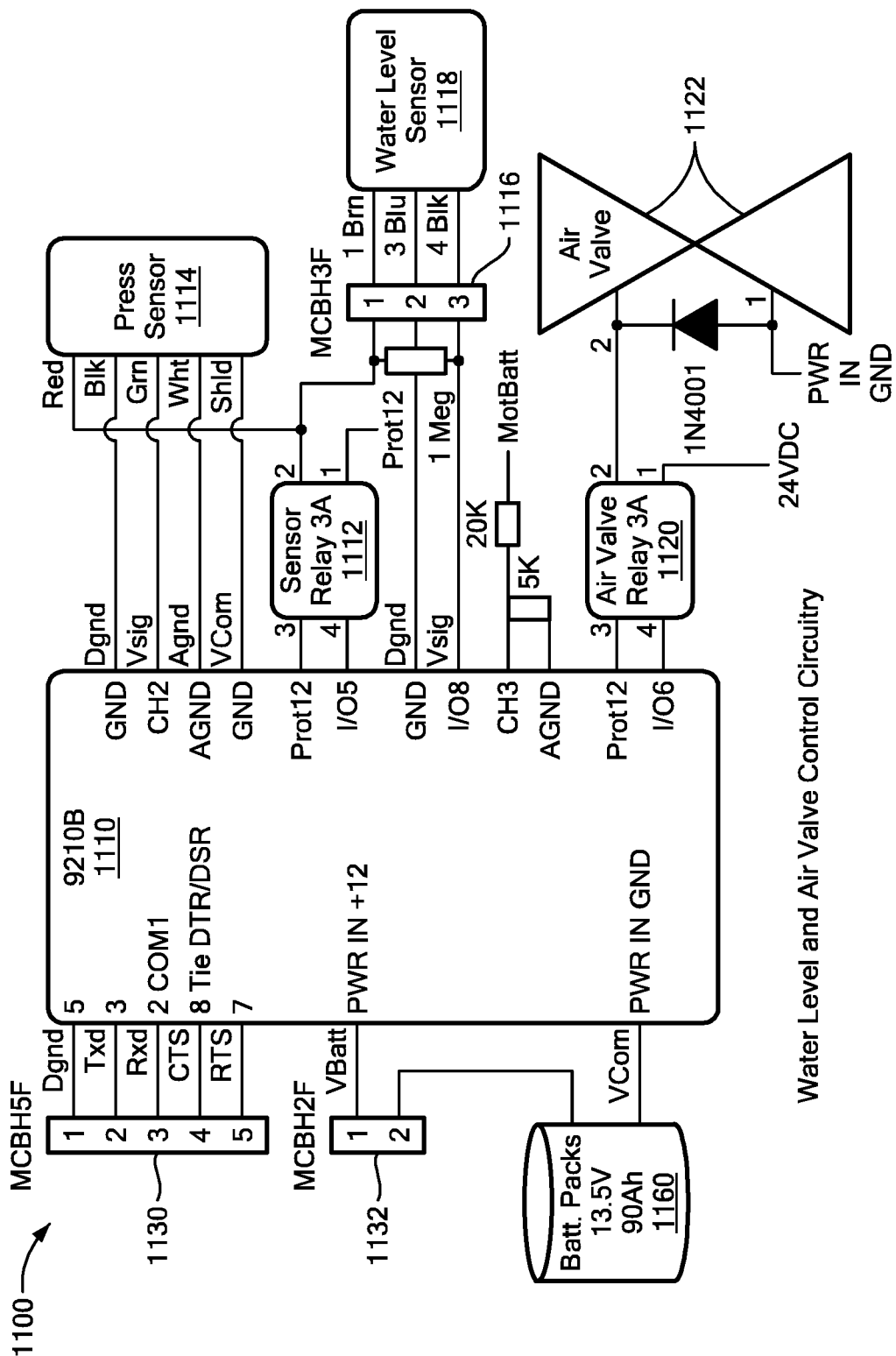
FIG. 11 is a schematic of an example water level and air valve control circuit according to the present disclosure.

FIG. 11 is a schematic diagram of an example water level sensing and air valve control circuit 1100, according to an exemplary embodiment of the present disclosure. In circuit 1100, a main controller 1110 is connected to pressure relay 1112 and pressure sensor 1114. In exemplary embodiments, controller 1110 is the same as controller 1010 shown in FIG. 10. Pressure sensor 1114 is local to the controller 1110 and can be used to measure pressure (P1 in FIG. 2), e.g., in the immediate vicinity of the main vessel housing 110 of FIG. 2 at its location in the water column. Pressure relay 1112 is shown connected to water level sensor 1118 via connector 1116. Main controller 1110 is shown connected to air valve relay 1120, which is connected to air valve 1122. Connectors 1130 and 1132 are also shown. Battery 1160, supplying power, is connected to main controller 1110 and connector 1122.

Figure 12:
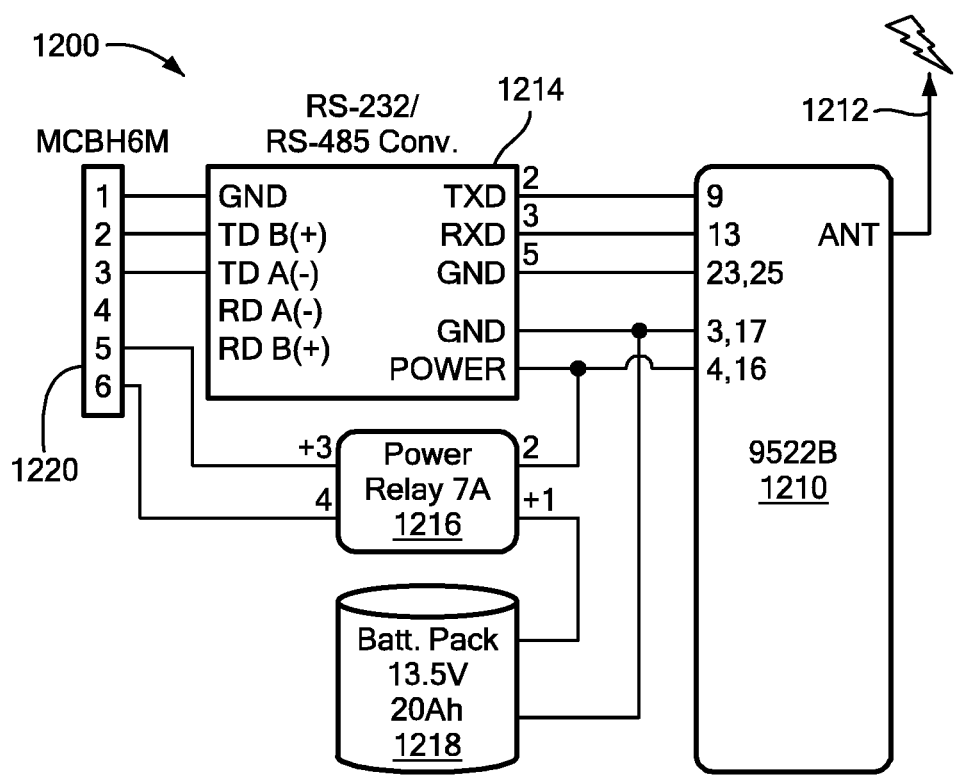
FIG. 12 is a schematic of an example transmitter control circuit according to the present disclosure.

FIG. 12 is a schematic diagram of an example transmitter (transceiver) circuit 1200 according to the present disclosure. Circuit 1200 includes a transmitter (transceiver) 1210 that is connected to antenna 1212 and RS-232/RS-485 Converter 1214. Transmitter 1210 is also connected to power relay 1216 and battery pack 1218. Circuit 1200 may also include connector 1220, as shown. In exemplary embodiments, transmitter 1210 is an Iridium 9522B L-Band Transceiver. Of course, in other embodiments, a transmitter/transceiver and antenna may be used that operate according to different transmission protocols (not necessarily satellite ones) such as common wireless air interface protocols including, e.g., 5G, 4G LTE, 3G, 2G, IEEE 802.11, IEEE 802.11x, and the like. In some embodiments, a transmitter 1210 may be used, which operates to transmit signals while in other embodiments, a transceiver may be used to both transmit and receive signals; further, in some embodiments, a transceiver can be used which transmits signals without necessarily receiving signals.

FIG. 13 includes FIGS. 13A, 13B, and 13C, which show a brake 1300 for slowing a submersible object. In accordance with exemplary embodiments, brake 1300 can be used to slow a main vessel housing, e.g., 110 of FIG. 1, during initial or subsequent deployment in the water column. FIG. 13A shows a top view of brake 1300, while FIG. 13B shows a side view and FIG. 13C shows a perspective view.

As shown, brake 1300 includes a door 1302 that is configured to open and close by rotation as part of a hinge formed by flanges 1304 and axles 1305. Door 1302 includes flanges 1314. Brake 1300 further includes a pressure activated lockout pin assembly including pin 1306 and cylinder 1308. The pin 1306 and cylinder 1308 operate to keep the door 1302 in an open or deployed position, e.g., while vessel 102 is descending in the water column during initial deployment. FIG. 13C shows door 1302 in an open position. Prior to a certain ambient pressure being reached, such as at a certain depth in a water column, pin 1306 is held in a position passing through all or a portion of near flange 1314, thereby blocking hinging movement of the door 1302 and preventing the door 1302 from being closed. Once that certain ambient pressure is reached, it will press pin 1306 into cylinder 1308 enough so that hinging motion is permitted and the door 1302 can be closed, e.g., by the force of gravity. By knowing the depth—and consequently pressure—at which it is desired for the locking device to unlock, the locking device can be designed accordingly, e.g., by designing the cylinder 1308 to hold a calculated amount of air at sea level. Because the air in the cylinder will compress as the vessel (or submersible object) descends in the water column, pin 1306 will move into cylinder 1308 in a corresponding manner. Magnets 1310 can be imbedded in the vessel and in the door 1312 to keep the doors closed, i.e., in a closed position as shown in FIG. 13B, after the locking device has unlocked and the door has closed due to gravity. While FIG. 13B shows pin 1306 partially extending from flange 1314, in a closed position for sub-surface operation, pin 1306 would typically be positioned further in cylinder 1308 due to the ambient pressure.

In exemplary embodiments of the present disclosure, a vessel (e.g., 102 of FIG. 1) includes multiple brakes 1300 on its main vessel housing 110. The brakes 1300 are devices useful to increase the drag of the vessel. Brakes 1300 are preferably used for the initial free-fall of the system (including 102) when the anchor used for initial deployment lands on the seabed. The vessel's built-up inertia from the initial free-fall event can be reduced by the increased drag from the brakes 1300 (brakes need not be used after initial deployment). Each door 1302 has its own pressure activated locking device (pin and cylinder 1308) that keeps the door 1302 from closing until the vessel is below the surface at a predetermined depth and, preferably, in the vertical position. When the vessel on which a brake is installed reaches the pre-determined depth in the water column, e.g., between 5 m and 10 m depth, the locking device will open due to pressure exerted on the pin. When the vessel stops in the water column, such as when its anchor has landed on the seabed, the now "un-locked" doors can freely close. The doors are hinged in a manner that the forces of gravity will automatically close them. The magnets 1312, 1310 imbedded in the doors and vessel keep the doors 1302 closed throughout operation of the vessel—minimizing drag—for collecting and transmitting data. In exemplary embodiments, three brakes 1300 may be used for a vessel, e.g., 102 of FIG. 1.

FIG. 14 depicts a table 1400 showing net buoyancy calculations for an exemplary embodiment at multiple water depths as the air chamber volume (within bellhousing 200) shrinks due to effects of increasing pressure with increasing depth. Table values or calculations for table values can be incorporated into a system controller, e.g., controller 1010 of FIG. 10 or controller 1110 of FIG. 11.

Accordingly, embodiments of the inventive subject matter can afford benefits relative to prior art techniques. Such benefits may include but are not limited to the ability for the main vessel housing to keep the transmitter buoy submerged for extended periods of time. The times and/or frequency of transmission at the surface can be preprogrammed, e.g., at set times, to occur under certain conditions or in response to certain triggering events, and/or can be programmed via reception of instructions sent to the system, e.g., while the transmitter buoy is in a transmitting location and its antenna is above the water surface. Embodiments of the inventive subject matter can provide the ability to preserve vital data from a sub-surface moored instrument in the event recovery of the sub-surface moored instrument is not successful.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

For example, while use of a jacketed wire rope or inductive cable has been described above for providing inductive modulation to transmit data and/or control instructions from the data collection device(s) to the deployable vessel, different modulation protocols, e.g., Ethernet, or the like can be used for data transmission in alternate embodiments. Ethernet cable can provide increased bandwidth and reduced susceptibility to noise and variability of seawater conductive properties than inductive modulation using an inductive modem using a grounded sea-water connection. For further example, while brakes are described above for FIG. 13 primarily in the context of use with vessel 102 and vessel housing 110, such brakes may be employed on other surfaces of other vessels or structures.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one"

indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A system for deploying a transmitter to a water surface from a sub-surface location, the system comprising:
a main vessel having a main vessel housing having a longitudinal axis and an inner chamber;
a sub-surface attachment point;
a bellhousing having an open end and a sealed end, wherein the bellhousing is disposed within the chamber of the main vessel housing and configured to retain air in its sealed end when the main vessel housing is oriented in the water column with the longitudinal axis substantially vertical such that the sealed end of the bellhousing is closed to the water surface than the open end;
a motorized payout-and-retrieval system disposed within the bellhousing for deploying and retracting a length of cable connecting the bellhousing to the sub-surface attachment point, wherein the cable comprises a jacketed wire rope and is operative as a data link connecting one or more sub-surface sensors to the main vessel;
a surface transmitter operative to transmit electromagnetic signals and coupled to the main vessel housing by an electromechanical (EM) cable, wherein the EM cable is operative to transfer signals from the main vessel to the surface transmitter; and
a system controller operative to control the motorized payout-and-retrieval system to raise and lower the main vessel within the water column from a first position in which the surface transmitter is below the water surface to a second position in which the surface transmitter is at the water surface.

2. The system of claim 1, further comprising a frame disposed within the bellhousing and configured to hold the motorized payout-and-retrieval system.

3. The system of claim 2, further comprising a gas injection system mounted on the frame and including one or more compressed-gas tanks, wherein the gas injection system is operative to adjust buoyancy of the bellhousing by injecting gas into the bellhousing, wherein the system controller is operative to control operation of the gas injection system.

4. The system of claim 3, further comprising a sealed electronics housing, wherein the system controller is disposed within the sealed electronics housing, and wherein the sealed electronics housing is mounted to the frame.

5. The system of claim 3, further comprising a water-level sensor assembly operative to indicate water level within the bellhousing, wherein the system controller is operative to control the gas injection system to inject gas into the bellhousing to adjust the water level based on the water level indicated by the water-level sensor assembly.

6. The system of claim 1, further comprising an inductive modem operative to transmit signals over the cable connecting the one or more sensors to the main vessel housing, wherein the data link includes the cable.

7. The system of claim 1, wherein the data link is operative to convey data according to the Ethernet protocol.

8. The system of claim 1, wherein the motorized payout-and-retrieval system includes a gearbox connected to a motor.

9. The system of claim 1, further comprising syntactic foam disposed within the inner chamber of the main vessel housing.

10. The system of claim 1, wherein the sub-surface attachment point comprises a sub-surface buoy.

11. The system of claim 1, wherein the surface transmitter comprises an Iridium network transceiver.

12. The system of claim 1, wherein the surface transmitter comprises a transceiver compliant with a mobile wireless protocol.

13. The system of claim 1, further comprising a transmitter buoy, wherein the surface transceiver is coupled to the transmitter buoy.

14. The system of claim 13, wherein the transmitter buoy includes a fish-line cutter.

15. The system of claim 1, further comprising a brake disposed on the main vessel housing, the brake including a deployable door and a pressure activated lockout pin assembly configured to prevent the door from leaving a deployed position until the main vessel housing has reached a predetermined depth in the water column.

16. The system of claim 15, wherein the brake further comprises a magnetic closure assembly configured to hold the door in a closed position when the motorized housing has stopped moving after initial free-fall in the water column.

17. A system for deploying a transmitter to a water surface from a sub-surface location, the system comprising:
 a main vessel having a main vessel housing;
 a bellhousing having an open end and a sealed end, wherein the bellhousing is disposed within the main vessel housing;
 means for payout-and-retrieval disposed within the bellhousing for deploying and retracting a length of jacketed wire rope connecting the bellhousing to a sub-surface attachment point, wherein the means for payout-and-retrieval comprises a data link between the bellhousing and one or more sub-surface sensors;
 a surface transmitter operative to transmit electromagnetic signals and coupled to the main vessel housing by an electromechanical (EM) cable; and
 a system controller operative to control the means for payout-and-retrieval to raise and lower the main vessel within the water column from a first position in which the surface transmitter is below the water surface to a second position in which the surface transmitter is at the water surface.

18. The system of claim 17, further comprising further a gas injection system disposed in the bell housing and including one or more compressed-gas tanks, wherein the gas injection system is operative to adjust buoyancy of the bellhousing by injecting gas into the bellhousing, wherein the system controller is operative to control operation of the gas injection system.

19. The system of claim 17, further comprising an inductive modem operative to transmit signals over the jacketed wire rope connecting the one or more sensors to the bell housing.

20. The system of claim 17, wherein the surface transmitter comprises a transceiver.

* * * * *